United States Patent
Yun et al.

(10) Patent No.: US 12,209,909 B2
(45) Date of Patent: Jan. 28, 2025

(54) SYSTEMS AND METHODS FOR STIMULATED BRILLOUIN MICROSCOPY

(71) Applicant: THE GENERAL HOSPITAL CORPORATION, Boston, MA (US)

(72) Inventors: Seok-Hyun Yun, Boston, MA (US); Amira Eltony, Boston, MA (US); Desmond Chow Ming Chia, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 413 days.

(21) Appl. No.: 17/615,991

(22) PCT Filed: Jun. 3, 2020

(86) PCT No.: PCT/US2020/035888
§ 371 (c)(1),
(2) Date: Dec. 2, 2021

(87) PCT Pub. No.: WO2020/247473
PCT Pub. Date: Dec. 10, 2020

(65) Prior Publication Data
US 2022/0326080 A1    Oct. 13, 2022

Related U.S. Application Data

(60) Provisional application No. 62/856,662, filed on Jun. 3, 2019.

(51) Int. Cl.
*G01J 3/44* (2006.01)
*G01N 21/63* (2006.01)
*H01S 3/108* (2006.01)

(52) U.S. Cl.
CPC .......... *G01J 3/4412* (2013.01); *G01N 21/636* (2013.01); *H01S 3/108* (2013.01); *G01N 2021/638* (2013.01)

(58) Field of Classification Search
CPC ................ G01J 3/4412; G01N 21/636; G01N 2021/638; H01S 3/108
See application file for complete search history.

(56) References Cited

U.S. PATENT DOCUMENTS

| 4,973,853 A | * | 11/1990 | Leonard | .................... G01J 5/08 |
| | | | | 374/E11.018 |
| 6,573,737 B1 | * | 6/2003 | Lyon | .................... G01N 21/636 |
| | | | | 324/762.05 |

(Continued)

FOREIGN PATENT DOCUMENTS

WO    WO-2019195100 A1  *  10/2019  ............. C23C 14/52

OTHER PUBLICATIONS

PCT/US2020/035888—International Search Report and Written Opinion—Aug. 20, 2020.

(Continued)

*Primary Examiner* — Tarifur R Chowdhury
*Assistant Examiner* — Kemaya Nguyen
(74) *Attorney, Agent, or Firm* — QUARLES & BRADY LLP

(57) ABSTRACT

Systems and methods are provided for analyzing a biomechanical property of a medium using stimulated Brillouin scattering microscopy. The method can include a first step of applying a probe beam and pulsed pump beam to a target section of the medium, wherein the pump beam interacts with the probe beam to generate at least one acoustic wave in the medium and at least one Brillouin signal is produced as a result of the generated acoustic wave. The method can also include a second step of receiving the produced Brillouin signal and a third step of determining, using a processor and the Brillouin signal, information associated with at least one biomechanical property of the target section.

19 Claims, 12 Drawing Sheets

(56) References Cited

U.S. PATENT DOCUMENTS

| | | | | |
|---|---|---|---|---|
| 9,041,931 B2* | 5/2015 | Colgan | ................. | G01Q 60/22 |
| | | | | 356/423 |
| 2006/0104582 A1 | 5/2006 | Frampton et al. | | |
| 2007/0236700 A1* | 10/2007 | Yun | .................... | G01N 21/4795 |
| | | | | 356/477 |
| 2009/0263069 A1* | 10/2009 | Hartog | .............. | G01D 5/35358 |
| | | | | 385/12 |
| 2009/0323056 A1* | 12/2009 | Yun | ......................... | G01J 3/26 |
| | | | | 356/326 |
| 2016/0273998 A1* | 9/2016 | Tur | ..................... | G01M 11/319 |
| 2017/0254749 A1* | 9/2017 | Yun | ..................... | A61B 5/0095 |
| 2019/0242820 A1* | 8/2019 | Audoin | ............... | G01N 21/636 |
| 2019/0391070 A1* | 12/2019 | Morrow | .............. | G01N 21/636 |
| 2022/0326080 A1* | 10/2022 | Yun | ........................ | H01S 3/108 |

OTHER PUBLICATIONS

Prevedel, et al., "Brillouin microscopy—a revolutionary tool for mechanobiology?", arXiv preprint arXiv:1901.02006 (2019).

* cited by examiner

SYSTEMS AND METHODS FOR STIMULATED BRILLOUIN MICROSCOPY

CROSS REFERENCE TO RELATED APPLICATIONS

This application is a U.S. National Stage of PCT Application No. PCT/US2020/035888 filed on Jun. 3, 2020 which is based on, claims priority to, and incorporates herein by reference in its entirety for all purpose, U.S. Provisional Ser. No. 62/856,662, filed Jun. 3, 2019, and entitled, "SYSTEMS AND METHODS FOR STIMULATED BRILLOUIN MICROSCOPY."

STATEMENT REGARDING FEDERALLY SPONSORED RESEARCH

This invention was made with government support under R01-EB027653 awarded by National Institutes of Health. The government has certain rights in this invention.

BACKGROUND OF THE INVENTION

The present disclosure generally relates to improvements to Brillouin microscopy techniques. Specifically, the present disclosure relates to systems and methods for stimulated Brillouin scattering (SBS) microscopy.

Mechanical measurement is of fundamental importance in many areas of biomedical science and engineering, from developing biomaterials to understanding mechanotransduction. Biomaterials make direct, physical contact with their encapsulating cells and surrounding tissues. Therefore, it is important that their mechanical properties, such as stiffness, are optimized for integration into their environment, or to promote an intended interaction. Excessive hardness can cause physical damage to soft tissues, while very soft materials may be too easily deformed from their optimal shape and function. The proliferation and differentiation of cells are affected by local mechanical cues. For example, chondrocytes for cartilage regeneration require biomaterial scaffolds that mimic the natural physical, as well as chemical and biological, environment in the cartilage. As such, measuring the mechanical properties of biomaterials, such as stiffness, viscosity and hardness, is one of the fundamental steps in biomaterial sciences and engineering.

Mapping the mechanical properties of biomaterials, tissues, and cells provides useful information to understand underlying biological processes. The biomechanical characterization of cytoskeleton is critical to understand how cells respond to external mechanical cues and produce cellular movement and collective behavior. The elastic, viscous, and other mechanical properties of tissues and cells provide critical information on how cells alter their cytoskeleton in healthy and disease states and respond to external cues, such as injury-induced cytokines and stiffness change in extracellular matrix (ECM). The stiffness of extracellular matrices not only affects wound healing and metastasis, but also plays a crucial role in tissue regeneration and stem-cell differentiation. Optimizing the mechanical properties of biomaterial scaffolds is critical to optimize cell delivery and proliferation in vivo. Measuring these properties in situ is required to understand how cells regulate intracellular mechanics and how these properties change as cells interact with their microenvironment, during aging and injury healing, as well as in the course of disease pathogenesis. Matrix elasticity directs stem cell lineage specification via mechanotransduction signaling. Moreover, many diseases have been directly linked to mechanical changes in tissues, for which tissue stiffness can serve as a diagnostic marker or a therapeutic target. Measuring mechanical phenotypes of cells has been essential in investigating mechanotransduction, grading metastatic potential of a cancer patient, and developing therapies targeting cellular mechanical machinery.

Previous systems and methods are limited in their ability to acquire non-destructive, high-resolution measurements. Additionally, many traditional mechanical tools, such as rheometers and stress-loading mechanical machines, are only useful to obtain average properties of a whole sample. Stress-strain "Instron" machines and rheometers are the most widely-used tools for mechanical characterization. This standard equipment will likely continue to be a workhorse for comprehensive mechanical measurement of relatively large, homogeneous samples with regular shapes. They are particularly useful for inducing large deformation to measure yield, failure, and nonlinearity. However, these tools are not suited for measuring small specimens less than a few millimeters, let alone cells. Because their readout represents the integrated response of an entire sample, they are not very useful for studying heterogeneous biomaterials and tissues.

Elastography is a medical imaging-based technique that maps the elastic properties and stiffness of soft tissue. Magnetic resonance imaging, ultrasound elastography, and optical coherence tomography (OCT) elastography are promising, but their spatial resolutions are typically over 1 mm, limited by the spatial resolution of the imaging modality itself, or by the wavelengths of the excited acoustic waves. Consequently, these methods also struggle to measure mechanical properties of small specimens or cells.

For characterizing small samples with cellular or subcellular resolution, atomic force microscopy (AFM) and magnetic bead twisting are widely used to measure the viscoelastic moduli and deformability of cells and have helped to investigate crosslinking, branching and pre-stress in the cytoskeleton. However, these techniques require contact with samples to impose mechanical stress, which limits the applicability to tissue surfaces, cells cultured on flat 2D substrates, or micro-patterned wells. Optical tweezers or stretchers, micropipette aspiration, and microfluidic deformation assays have been used to assess the elasticity of a cell in suspension, but without sub-cellular resolution.

For cells in 3D hydrogels, particle-tracking microrheology is a potentially viable technique but requires the insertion of microbeads into the samples or, if tracking subcellular components, it is influenced by motor activity; furthermore, the resolution is limited by the number, size and random spatial distribution of the beads.

Brillouin light scattering microscopy fills the gap among mechanical measurement tools. Brillouin scattering can exist in two primary forms: (i) spontaneous Brillouin scattering, in which an interaction between an incident beam and a produced acoustic wave in the sample produces a shift in a measured light frequency; and (ii) stimulated Brillouin scattering, in which a light frequency constructively interferes with the incident beam, thereby amplifying the acoustic wave and producing an amplified shifted light frequency to be measured. However, when using pump powers that are permissible to exposure to skin and corneal tissues, stimulated Brillouin scattering attempts using continuous wave pump beams have previously resulted in lower signal-to-noise ratios (SNRs) when compared to spontaneous Brillouin scattering techniques. Consequently, Brillouin microscopy techniques for measuring biomaterial mechanical properties has primarily employed spontaneous Brillouin scattering techniques, and Spontaneous Brillouin spectroscopy and microscopy have emerged as promising tools for mechanical measurement. Brillouin microscopy based on spontaneous Brillouin light scattering spectroscopy has been previously developed as a non-contact, label-free technique. This technology has shown potential in biomechanical sciences and medical diagnosis. However, while current spontaneous Brillouin microscopy is expected to find growing applications, it has almost reached a theoretical limit in terms of the generation and collection of Brillouin scattered light.

Consequently, the current Brillouin technique has two major drawbacks. First, as a result of the theoretical limit, the measurement speed is still slow in the order of 0.2 seconds per point, impeding widespread adoption of the technology. Second, the current scheme measures longitudinal modulus, but arguably more useful parameter for soft matter is shear (or Young's) modulus, which is directly correlated with a subject's haptic experience and essential for finite-element mechanical modeling of materials. Therefore, spontaneous Brillouin spectroscopy will remain as a rather slow imaging modality with a typical pixel acquisition time of around 0.1 seconds. To break this bottleneck, there is a need for a fundamentally different method to generate Brillouin scattering.

Stimulated Brillouin scattering (SBS) can in principle increase the Brillouin signal by generating amplification or Brillouin gain. The magnitude of Brillouin gain is, however, typically very small unless intense light over a long interaction length are used. This condition can be met using a single, narrowband laser source in optically-guided structures, such as long optical fibers. However, in settings such as a microscope, the interaction length is much limited to the level of several microns to submicron. In this short length, Brillouin gain would be extremely small unless very high intensity light is used.

To enhance SBS gain, more than single laser beams, designated as a pump and a probe, can be used. The two beams are usually counter propagating (180 degree) or propagating with an angle equal to or greater than 90 degree. In some acoustically-guided multi-mode structures, the two beams can be co-propagating. In these pump-probe arrangements, SBS can be generated when the optical frequency difference of the pump and probe light falls into the Brillouin shift spectrum, either Stokes or anti-Stokes shift, of a sample where the two beams overlap. The interference patterns of the two beams causes a moving refractive index grating via the electrostriction effect in the sample. The grating gives rise to Brillouin scattering. This phenomenon is proportional to the product of the intensity of the pump and that of the probe. Recently, SBS in water and water-containing samples has been demonstrated using a continuous-wave pump beam and a continuous-wave probe beam. To generate measurable SBS signals, the average power required at the sample exceeded 100 mW. This amount of light exposure causes the risk of sample damage by heating and is prohibitive in many cases including in vivo human measurements. Furthermore, techniques to achieve and measure SBS based on shear acoustic waves have not been developed.

Thus, there exists a need for systems and methods that allow for Brillouin microscopy and spectroscopy that improves the longitudinal modulus measurement speed of traditional spontaneous Brillouin systems. In addition, there exists a general unmet need for new techniques for measuring the shear modulus of biomaterials.

SUMMARY OF THE INVENTION

The present disclosure provides systems and methods that overcome the aforementioned drawbacks and others using stimulated Brillouin scattering (SBS) techniques and configurations not previously known. Compared to previous spontaneous Brillouin microscopy systems, the SBS systems and methods described herein offer compelling advantages in terms of acquisition speed and the ability to measure shear elasticity. In the systems and methods described herein, optical pulses can be employed to incident beams to enhance the SNR when compared to prior continuous wave SBS systems. Consequently, the pulsed configurations described herein facilitate the use of high-speed SBS with low average powers and at subcellular resolution. As a result, the acquisition speed of longitudinal-wave Brillouin spectroscopy can be increased by as much as 1,000 times when compared to previous techniques. Furthermore, unlike spontaneous Brillouin scattering, the SBS techniques described herein are a coherent process allowing for effective interferometric detection. Taking advantage of this unique attribute of SBS, a shear-wave SBS microscopy for measuring shear modulus at high resolution has also been developed.

In one aspect, the present disclosure provides a method of analyzing a biomechanical property of a medium using Brillouin microscopy. The method can comprise a first step of applying a probe beam and pulsed pump beam to a target section of the medium, wherein the pump beam interacts with the probe beam to generate at least one acoustic wave in the medium and at least one Brillouin signal is produced as a result of the generated acoustic wave. The method can also comprise a second step of receiving the produced Brillouin signal and a third step of determining, using a processor and the Brillouin signal, information associated with at least one biomechanical property of the target section.

In another aspect, the present disclosure provides a Brillouin microscopy system for analyzing a biomechanical property of a medium. The system can comprise a probe optical source configured to apply a probe beam to a target section of the medium and a pump optical source configured to apply a pulsed pump beam to the target section of the medium, wherein the pump beam interacts with the probe beam to generate at least one acoustic wave in the medium and at least one Brillouin signal is produced as a result of the generated acoustic wave. The system can also comprise a sensor configured to receive the produced Brillouin signal and a processor configured to determine information associated with at least one biomechanical property of the target section using the Brillouin signal.

In one aspect, the present disclosure provides a method of measuring shear modulus information of a medium using Brillouin microscopy. The method can comprise a first step of applying a probe beam and pump beam to a target section of the medium, wherein the pump beam interacts with the probe beam to generate at least one acoustic wave in the medium and at least one Brillouin signal is produced as a result of the generated acoustic wave. The method can also comprise a second step of receiving the produced Brillouin signal and a third step of determining, using a processor and the Brillouin signal, information associated with the shear modulus of the target section.

In another aspect, the present disclosure provides a Brillouin microscopy system for measuring shear modulus information of a medium. The system can comprise a probe optical source configured to apply a probe beam to a target section of the medium and a pump optical source configured to apply a pump beam to a target section of the medium, wherein the pump beam interacts with the probe beam to generate at least one acoustic wave in the medium and at least one Brillouin signal is produced as a result of the generated acoustic wave. The system can also comprise a sensor configured to receive the produced Brillouin signal and a processor configured to determine information associated with the shear modulus of the target section using the Brillouin signal.

In one aspect, the present disclosure provides a method of measuring longitudinal and shear moduli information of a medium using Brillouin microscopy. The method can comprise a first step of applying a first probe beam and a pulsed first pump beam to a target section of the medium, wherein the first pump beam interacts with the first probe beam to generate at least one first acoustic wave in the medium and at least one first Brillouin signal is produced as a result of the generated acoustic wave. The method can also comprise a second step of applying a second probe beam and a second pump beam to a target section of the medium, wherein the second pump beam interacts with the second probe beam to generate at least one second acoustic wave in the medium and at least one second Brillouin signal is produced as a result of the generated acoustic wave. The method can also comprise a third step of receiving the produced first and second Brillouin signals and a fourth step of determining, using a processor and the first and second Brillouin signals, information associated with both the longitudinal modulus and shear modulus of the target section.

In another disclosure, the present disclosure provides a Brillouin microscopy system for measuring the longitudinal and shear moduli information of a medium. The system can comprise a longitudinal configuration having a first probe optical source configured to apply a first probe beam to a target section of the medium and a first pump optical source configured to apply a pulsed first pump beam to the target section of the medium. The system can also comprise a shear-wave configuration having a second probe optical source configured to apply a second probe beam to the target section of the medium and a second pump optical source configured to apply a second pump beam to the target section of the medium, wherein the first pump beam interacts with the first probe beam or the second pump beam interacts with the second probe beam to generate at least one acoustic wave in the medium and at least one Brillouin signal is produced as a result of the generated acoustic wave. The system can further comprise a sensor configured to receive the produced Brillouin signal and a processor configured to determine information associated with at least one of a longitudinal modulus or a shear modulus of the target section.

The foregoing and other advantages of the disclosure will appear from the following description. In the description, reference is made to the accompanying drawings which form a part hereof, and in which there is shown by way of illustration a preferred embodiment of the disclosure. Such embodiment does not necessarily represent the full scope of the disclosure, however, and reference is made therefore to the claims and herein for interpreting the scope of the disclosure.

BRIEF DESCRIPTION OF THE DRAWINGS

The present disclosure will hereafter be described with reference to the accompanying drawings, wherein like reference numerals denote like elements.

DETAILED DESCRIPTION

Figure 1:
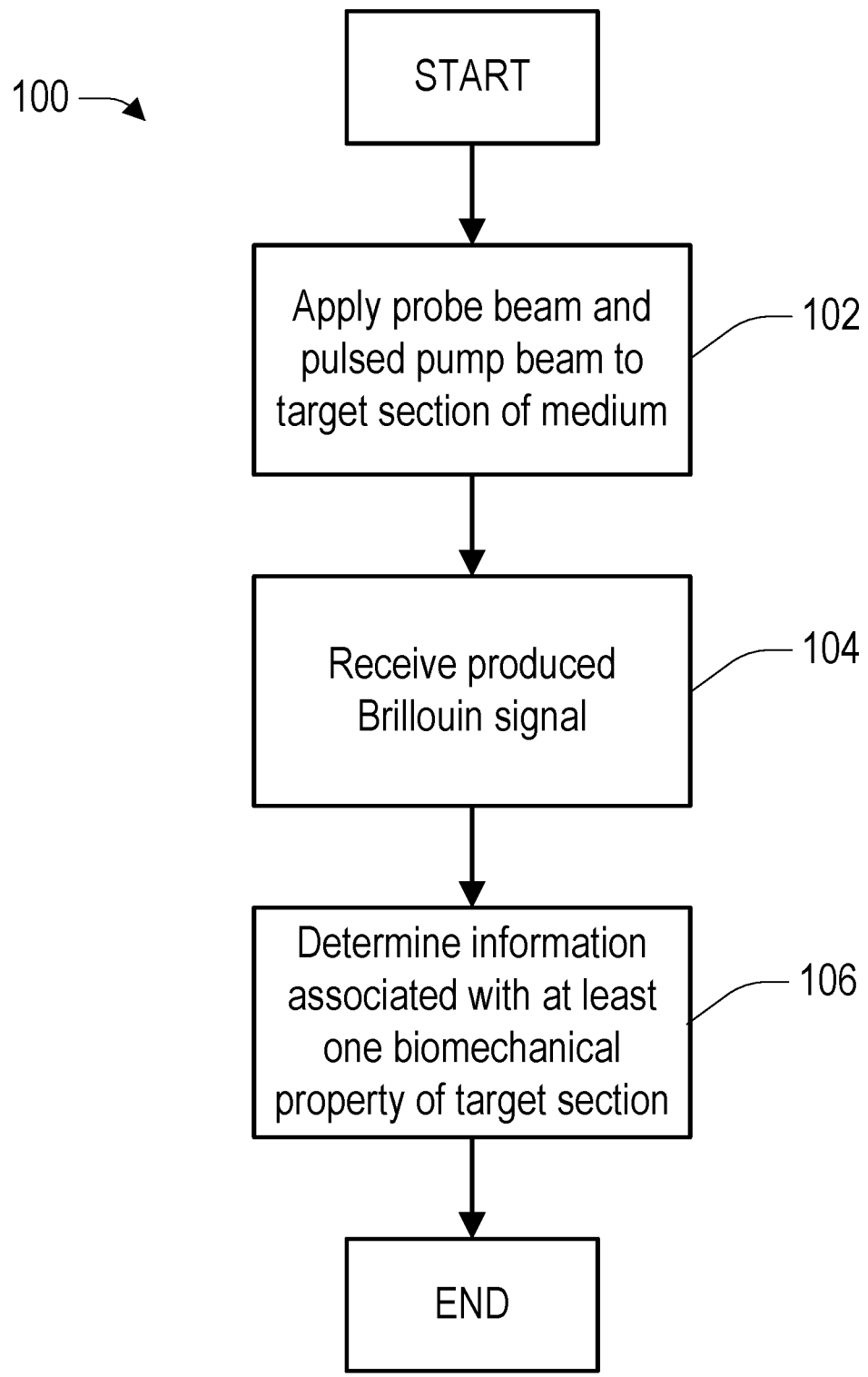
FIG. 1 is an illustration of a process flowchart for a method of analyzing a biomechanical property of a medium using Brillouin microscopy, in accordance with one aspect of the present disclosure.

The systems and methods provided herein are not limited to the particular embodiments described. The terminology used herein is selected for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements.

The present disclosure overcomes the aforementioned drawbacks of prior systems by using stimulated Brillouin scattering (SBS). SBS is a nonlinear optical phenomenon used in the physical sciences and waveguide devices. Thus far, SBS has been considered unsuitable for biomedical applications because it requires too high optical power (exceeding 270 mW) for biological samples.

Spontaneous Brillouin scattering is generated by acoustic waves that arise from thermal motion of molecules. In continuous medium, these vibrations can be viewed as collective vibrational modes at all frequencies propagating in all directions as acoustic waves, equivalent to acoustic phonons in solid state matter. The speed of acoustic propagation in soft tissues is about 2,000 to 2,500 m/s ($V_L$) for longitudinal waves and 3 to 30 m/s for shear waves ($v_S$). The acoustic waves form refractive index gratings via the photoelastic effect. Among these thermodynamically generated acoustic modes, those with acoustic wavelengths approximately equal to half of the optical wavelength ($\lambda_o/n$) in the medium (with a refractive index, n) give rise to phase-matched Bragg reflection of light. This phenomenon is spontaneous Brillouin scattering. The frequency of the scattered light is shifted by the Doppler effect. The Brillouin frequency shift is given by: $f_B=(2n/\lambda_o)v_{L,S}\cos(\theta/2)$ where $\theta$ is the scattering angle: 180° for backward scattering and 90° for the cross-axis geometry. The linewidth of the Brillouin scattering spectrum is the inverse of the lifetime of acoustic waves and therefore is related to the viscosity of the medium at the acoustic frequency. The scattering mechanism of SBS is identical except that the acoustic waves are generated by interference of a pump and a probe beam via electrostriction (i.e. electric-field dependent refractive index change).

The systems and methods described herein can use pump and probe light in order to produce stimulated Brillouin scattering. The techniques described herein can be integrated with standard confocal microscope platforms. The resulting systems can readily incorporate fluorescence contrast for labelling specific cells, subcellular compartments, and specific tissues in living organisms. Thus, the SBS microscopy techniques described herein offer a leap forward from traditional spontaneous Brillouin microscopy methods, and can be used as high-resolution, comprehensive tools for mechanical investigations of biomaterials, transparent ocular tissues, fresh tissue slices, organoids, cells, small animal models, and the like.

As further described, for longitudinal SBS, an intensity modulation scheme can be used to generate time-synchronized, nanosecond pulses for pump and probe light. Calculations show that this can generate >1,000 times higher signals than spontaneous Brillouin scattering at equivalent optical powers. The pulsed operation can represent ~100 times higher efficiency than is possible using continuous-wave (CW) schemes.

Shear-wave SBS has not yet been developed. To date, only longitudinal SBS has been successfully demonstrated. In some aspects, the systems and methods of the present disclosure allow for both longitudinal and shear moduli to be quasi-simultaneously obtained from samples at microscopic resolution. Thus, the SBS microscopy techniques described herein can in principle determine the complete stiffness matrix: that is, both the Lame parameters, $\lambda$ and $\mu$, of isotropic materials; and all 4 coefficients for fibrillary structures with hexagonal symmetry.

The primary output of Brillouin spectroscopy is the Brillouin frequency (the other output is acoustic loss via the linewidth). SBS microscopy can map the Brillouin frequency by scanning the focal volume at which the pump and probe beams meet. As this technique essentially measures the acoustic speed, it is analogous to ultrasound shear wave imaging. One difference, however, is that SBS microscopy uses focused light to generate acoustic waves whereas the ultrasound technique excites ultrasound using a transducer that requires physical contact. Another major difference is that the phase-matching acoustic frequency involved in SBS is several GHz for longitudinal waves and MHz for shear waves. In both cases, the phase-matching acoustic wavelength can be equal to a half of the optical wavelength, which is, for example, 280 nm for $\lambda_o$=780 nm and n=1.4. This submicron resolution contrasts with longer ultrasound wavelengths in the range of ~200 μm to 1 mm. The acoustic frequency range used in Lamb-wave OCT elastography is 0.3-1 kHz, and the corresponding acoustic wavelength is rather long, 2-5 mm. The shear modulus of isolated single cells has been measured recently using vibrational pipettes, but this technique is applicable only to isolated cells or small transparent objects with low modulus («100 Pa). By contrast, the SBS microscopy techniques described herein may be uniquely suited for non-contact, microscopic mapping in hydrogels, 2D and 3D cell cultures, tissue slices, and organoids.

FIG. 1 provides a process flowchart of some examples steps for a method 100 of analyzing a biomechanical property of a medium using Brillouin microscopy. The method 100 includes a first step 102 of applying a probe beam and pulsed pump beam to a target section of the medium, wherein the pump beam interacts with the probe beam to generate at least one acoustic wave in the medium and at least one Brillouin signal is produced as a result of the generated acoustic wave. The method 100 includes a second step 104 of receiving the produced Brillouin signal and a third step 106 of determining, using a processor and the Brillouin signal, information associated with at least one biomechanical property of the target section.

In the method 100, the at least one biomechanical property may include the longitudinal modulus of the target section. The probe beam may also be pulsed. If the probe beam is pulsed, the probe beam pulses may be applied at twice the rate that the pump beam pulses are applied to the target section. The total time averaged power of the pulsed probe beam and the pulsed pump beam may be less than 10 mW. The pulsed probe beam and the pump beam may both have a total time averaged power or energy density below the maximum permissible exposure limits for a human tissue. The pulsed probe beam and the pump beam may both have a total time averaged power or energy density below the maximum permissible exposure limits for human ocular tissue. The maximum permissible exposure limit for the pulsed probe beam and the pump beam may be calculated using the American National Standards Institute (ANSI) Z136 guidelines. The ratio of the time averaged power of the pulsed probe beam to the time averaged power of the pulsed pump beam may be between 1:2 and 1:6, between 1:3 and 1:5, or about 1:4. The pulse width of the pump beam may be between 2 and 5 nanoseconds.

Although not depicted, the method 100 may comprise a fourth step of displaying the at least one biomechanical property of the target section of the medium. The medium may be tissue, or more specifically, mammalian tissue or mammalian cells. The method step 106 may comprise compensating for the relative intensity noise of the probe beam. The acoustic wave may be amplified based on the interaction between the pump beam and the probe beam. The pump beam may be in counter-propagation with respect to the probe beam. The Brillouin signal may have a signal-tonoise ratio of at least 50 dB, at least 55 dB, at least 60 dB, or at least 65 dB. The Brillouin signal may be contained within a transmitted form of the probe beam.

Figure 2:
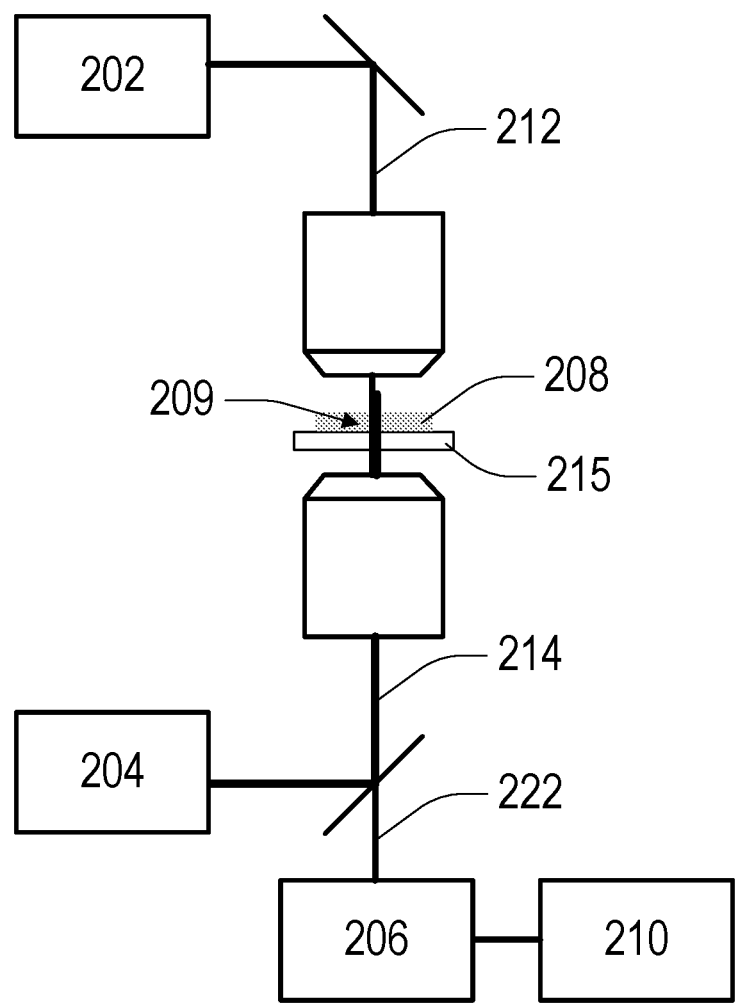
FIG. 2 is a schematic of a Brillouin microscopy system for analyzing a biomechanical property of a medium, in accordance with one aspect of the present disclosure.

FIG. 2 is a schematic of a Brillouin microscopy system 200 for analyzing a biomechanical property of a medium 208, such as may be used with the methods described herein. The system includes a probe optical source 202 configured to apply a probe beam 212 to a target section of the medium 209 and a pump optical source 204 configured to apply a pulsed pump beam 214 to the target section of the medium 209, wherein the pump beam 214 interacts with the probe beam 212 to generate at least one acoustic wave in the medium and at least one Brillouin signal is produced as a result of the generated acoustic wave. The system also includes a sensor 206 configured to receive the produced Brillouin signal and a processor 210 configured to determine information associated with at least one biomechanical property of the target section 209 using the Brillouin signal.

The at least one biomechanical property analyzed by the system 200 may include the longitudinal modulus of the target section 209. As shown, the sensor 206 may be configured to measure a transmitted form of the probe beam 222 after it has been transmitted through the target section 209, wherein the Brillouin signal is contained within the transmitted probe beam 222. In one form, both the pump beam 214 and the probe beam 212 may be vertically polarized. In order to achieve this vertical polarization, system 200 further include at least one quarter wave plate configured to alter the polarization of the probe beam 212. For instance, a pair of quarter wave plates may be positioned in the optical paths of both the pump beam 214 and probe beam 212. Both the pump beam 214 and probe beam 212 may be circularly polarized at the medium 208. After the medium, the probe beam 212 may continue toward the shared path of pump beam 214 and convert into horizontally polarized light after passing through a quarter wave plate. The system may include at least one polarizing beam splitter configured to redirect the transmitted probe beam 222 to the sensor. For instance, the probe beam 212 may be redirected to the sensor 206 through a polarizing beam splitter between the path of pump beam 214 and probe beam 222. Although not depicted, the system 200 may further comprise a filter positioned between the medium 208 and the sensor 206 and configured to prevent back-reflected pump beam light from contacting the sensor 206.

The probe beam 212 may be pulsed. In one form, the probe optical source 202 may comprise a continuous wave laser and an electro-optic modulator. Similarly, the pump optical source 204 may comprise a continuous wave laser and an electro-optic modulator. The sensor 206 may be a photo-diode sensor. In one form, the electrical signal provided by the photo-diode sensor may be a pulse train, where the amplitude of the pulse represents the addition of the probe power and the Brillouin signal. The integration of the electrical signal from photo-diode sensor may be performed using a boxcar integrator. The boxcar integrator may enhance the signal to noise ratio of the transmitted prove beam 222. The boxcar integrator may be specifically triggered at the pulse repetition rate and its gating window may be configured to coincide with the pulse duration of the transmitted probe beam 222. The integrated signal may be subsequently provided to an analog to digital converter before reaching the processor 210. The probe optical source 202 may be configured to tune the frequency of the probe beam 212 using feedback signal provided from a second photo-diode sensor. The probe optical source 202 may be configured to provide the pulsed probe beam with a total time averaged power or energy density below the maximum permissible exposure limits for human tissue. The probe optical source 202 may be configured to provide the pulsed probe beam with a total time averaged power or energy density below the maximum permissible exposure limits for human ocular tissue. The maximum permissible exposure limit for the pulsed probe beam may be calculated using the American National Standards Institute (ANSI) Z136 guidelines.

In the depicted system 200, the pump optical source 204 and the probe optical source 202 are configured to apply a pump beam 214 and a probe beam 212 that are counter-propagating with one another. The pump optical source 204 may have a peak power of less than 1 Watt. The pump optical source 204 may be configured to provide the pulsed probe beam with a total time averaged power or energy density below the maximum permissible exposure limits for human tissue. The pump optical source 204 may be configured to provide the pulsed probe beam with a total time averaged power or energy density below the maximum permissible exposure limits for human ocular tissue. The maximum permissible exposure limit for the pump beam may be calculated using the American National Standards Institute (ANSI) Z136 guidelines.

Although not depicted, the system 200 may further comprise a display in electrical communication with the processor 210 and configured to display the information associated with the at least one biomechanical property of the target section 209. As shown, a positioning system 215 may be configured to move the target section 209 of the medium with respect to the probe optical source 202 and pump optical source 204.

Figure 3:
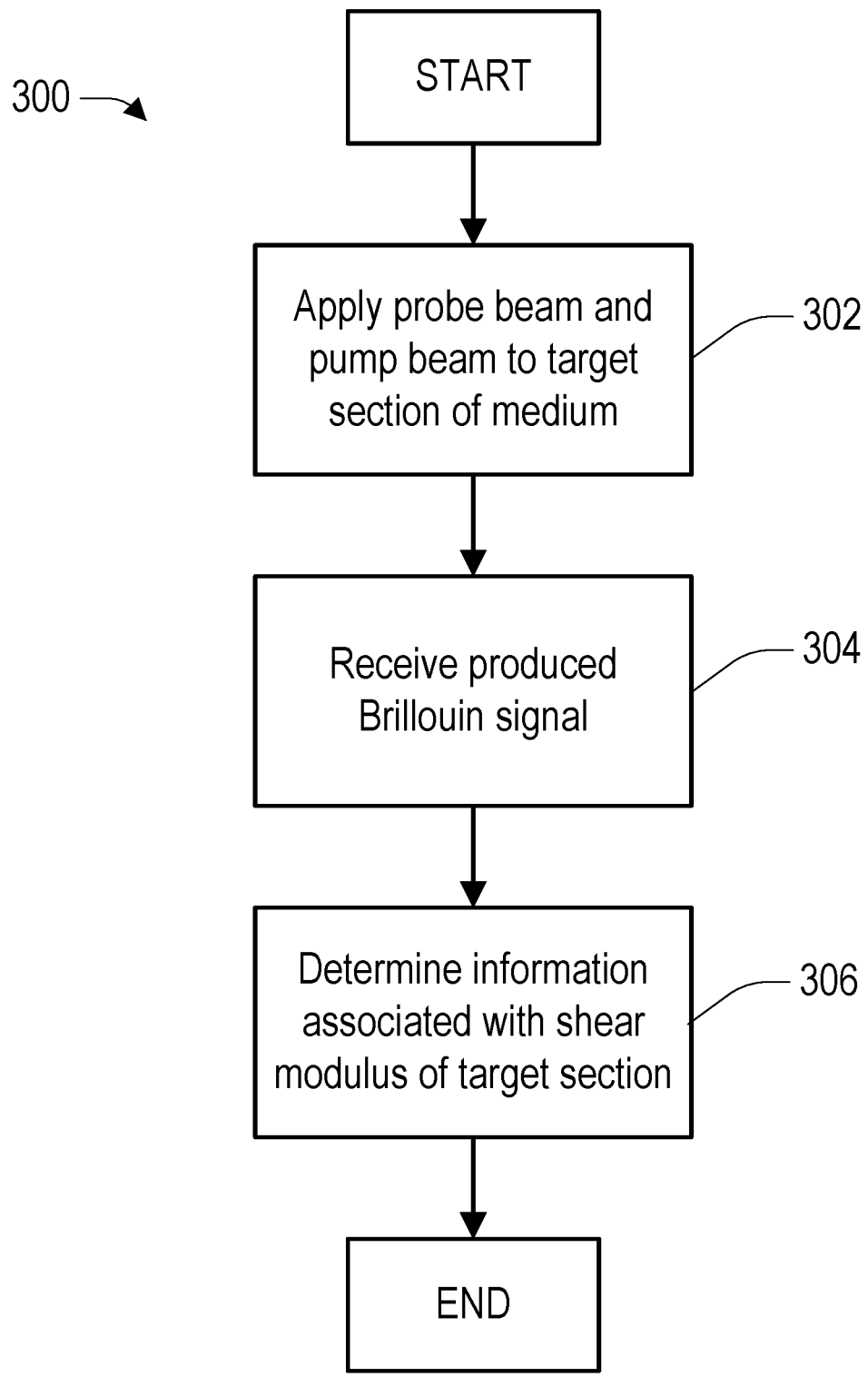
FIG. 3 is an illustration of a process flowchart for a method of measuring shear modulus information of a medium using Brillouin microscopy, in accordance with one aspect of the present disclosure.

FIG. 3 is a process flowchart providing some example steps of a method 300 of measuring shear modulus information of a medium using Brillouin microscopy. The method includes a first step 302 of applying a probe beam and pump beam to a target section of the medium, wherein the pump beam interacts with the probe beam to generate at least one acoustic wave in the medium and at least one Brillouin signal is produced as a result of the generated acoustic wave. The method also includes a second step 304 of receiving the produced Brillouin signal and a third step 306 of determining, using a processor and the Brillouin signal, information associated with the shear modulus of the target section.

In the method 300, a single laser may be used as an initial light source for both the probe beam and pump beam. The pump beam may be formed of light modulated with a square waveform. The polarization state of the probe beam may be orthogonal to the polarization state of the pump beam when applied to the target section. The total power of the probe beam and the pump beam may be less than 10 mW. The probe beam and the pump beam may both have a total time averaged power or energy density below the maximum permissible exposure limits for a human tissue. The probe beam and the pump beam may both have a total time averaged power or energy density below the maximum permissible exposure limits for human ocular tissue. The maximum permissible exposure limit for the probe beam and the pump beam may be calculated using the American National Standards Institute (ANSI) Z136 guidelines. The ratio of the power of the probe beam to the power of the pump beam is between 1:2 and 1:6, between 1:3 and 1:5, or about 1:4.

Although not depicted, the method 300 may comprise a fourth step of displaying the information associated with the shear modulus of the target section. The medium may be tissue, or more specifically, mammalian tissue or mammalian cells. The method step 306 may comprise compensating for the relative intensity noise of the probe beam. The acoustic wave may be amplified based on the interaction between the pump beam and the probe beam. The Brillouin signal may be contained within a transmitted form of the probe beam.

Figure 4:
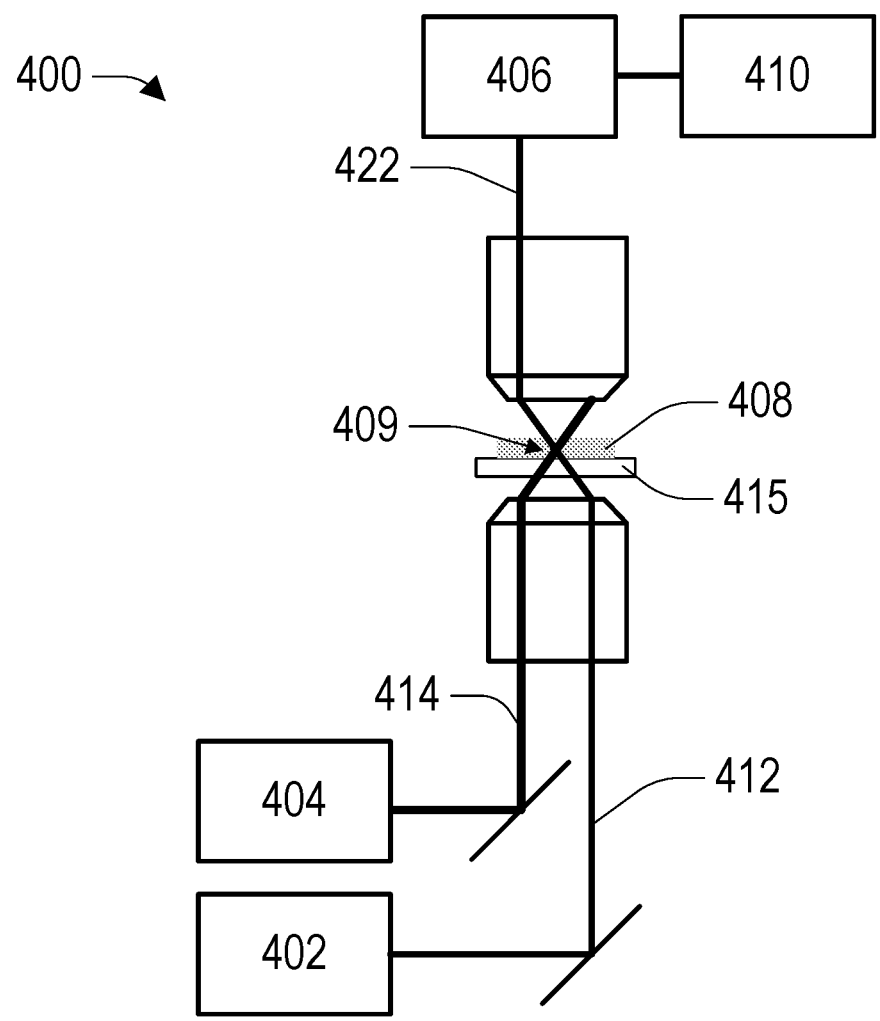
FIG. 4 is a schematic of a Brillouin microscopy system for measuring shear modulus information of a medium, in accordance with one aspect of the present disclosure.

FIG. 4 is a schematic of a Brillouin microscopy system 400 for measuring shear modulus information of a medium 408, such as may be used with the methods described herein. The system can comprise a probe optical source 402 configured to apply a probe beam 412 to a target section 409 of the medium and a pump optical source 404 configured to apply a pump beam 414 to a target section 409 of the medium, wherein the pump beam 414 interacts with the probe beam 412 to generate at least one acoustic wave in the medium and at least one Brillouin signal is produced as a result of the generated acoustic wave. The system further includes a sensor 406 configured to receive the produced Brillouin signal and a processor 410 configured to determine information associated with the shear modulus of the target section using the Brillouin signal.

The probe optical source 402 and the pump optical source 404 may share a single laser as an initial light source for both the probe beam 412 and pump beam 414. If this is the case, the single laser may be a continuous-wave laser. The pump optical source 404 may comprise an electro-optic modulator configured to modulate the pump beam light to have a square waveform. The probe optical source 402 may comprise at least one acousto-optic frequency shifter configured to modify the frequency of the probe beam light. The sensor 406 may be a photo-diode sensor. The sensor may be configured to measure a transmitted form of the probe beam 422 after it has been transmitted through the target section 408, wherein the Brillouin signal is contained within the transmitted probe beam 422. Although not depicted, the system 400 may further comprise a display in electrical communication with the processor 410 and configured to display the information associated with the shear modulus of the target section. As shown, the system 400 may comprise a positioning system 415 configured to move the target section 409 of the medium with respect to the probe optical source 402 and pump optical source 404.

Figure 5:
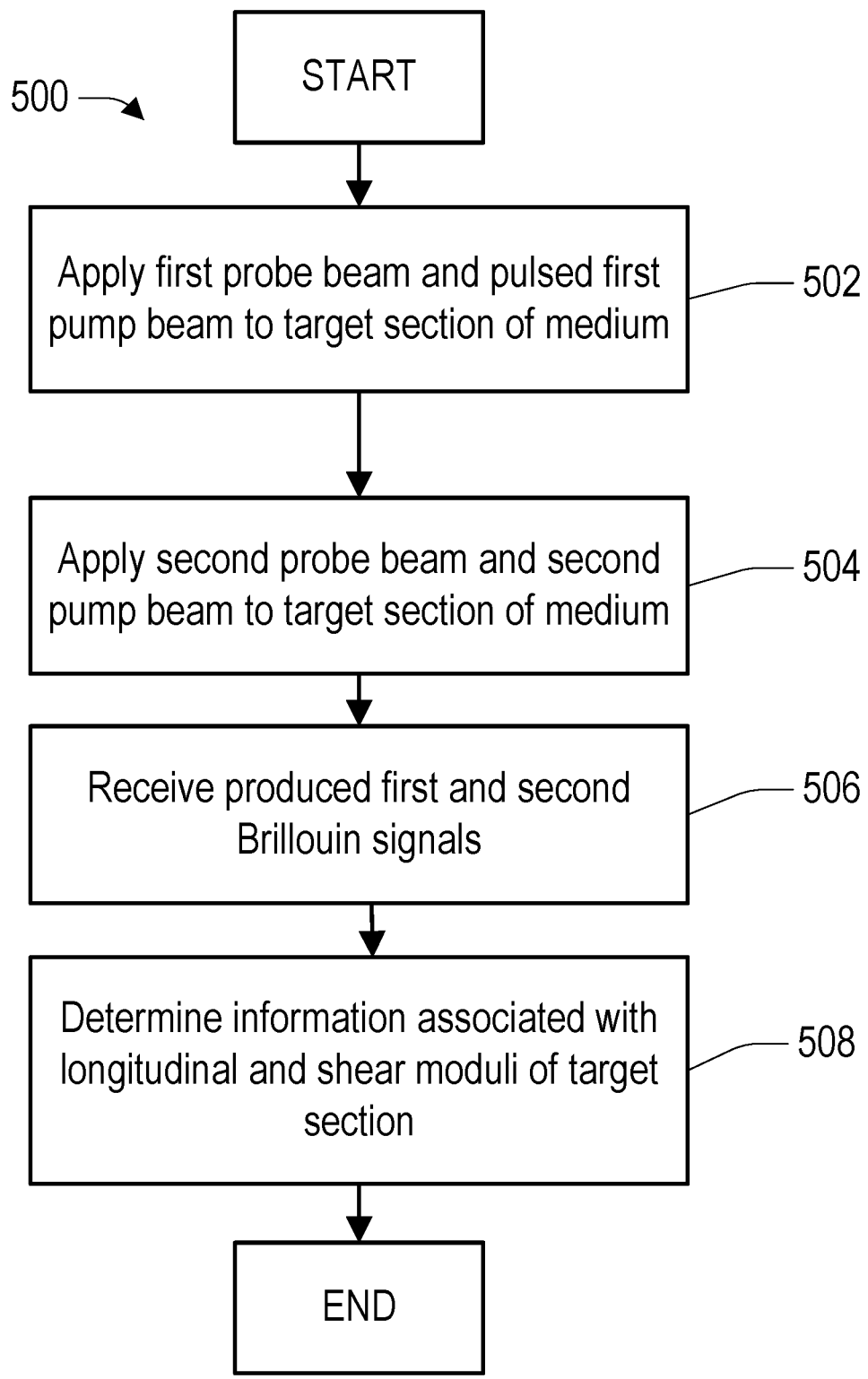
FIG. 5 is an illustration of a process flowchart for a method of measuring longitudinal and shear moduli information of a medium using Brillouin microscopy, in accordance with one aspect of the present disclosure.

FIG. 5 is a process flowchart providing some examples of steps of a method 500 of measuring longitudinal and shear moduli information of a medium using Brillouin microscopy. The method includes a first step 502 of applying a first probe beam and a pulsed first pump beam to a target section of the medium, wherein the first pump beam interacts with the first probe beam to generate at least one first acoustic wave in the medium and at least one first Brillouin signal is produced as a result of the generated acoustic wave. The method includes a second step 504 of applying a second probe beam and a second pump beam to a target section of the medium, wherein the second pump beam interacts with the second probe beam to generate at least one second acoustic wave in the medium and at least one second Brillouin signal is produced as a result of the generated acoustic wave. The method includes a third step 506 of receiving the produced first and second Brillouin signals and a fourth step 508 of determining, using a processor and the first and second Brillouin signals, information associated with both the longitudinal modulus and shear modulus of the target section.

In the method 500, the first probe beam and first pump beam may not be applied to a target section of the medium at the same time that the second probe beam and second pump are applied to the target section of the medium. Although not depicted, the method may further comprise an additional method step of switching between applying the first probe and pump beams and applying the second probe and pump beams to the target section. The first Brillouin signal may be used when determining the information associated with the longitudinal modulus of the target section. Likewise, the second Brillouin signal may be used when determining the information associated with the shear modulus of the target section. The multiple probe beams and pump beams of the method 500 may all have a total time averaged power or energy density below the maximum permissible exposure limits for a human tissue, or more specifically human ocular tissue. The maximum permissible exposure limit for the multiple probe beams and pump beams may be calculated using the American National Standards Institute (ANSI) Z136 guidelines.

Figure 6:
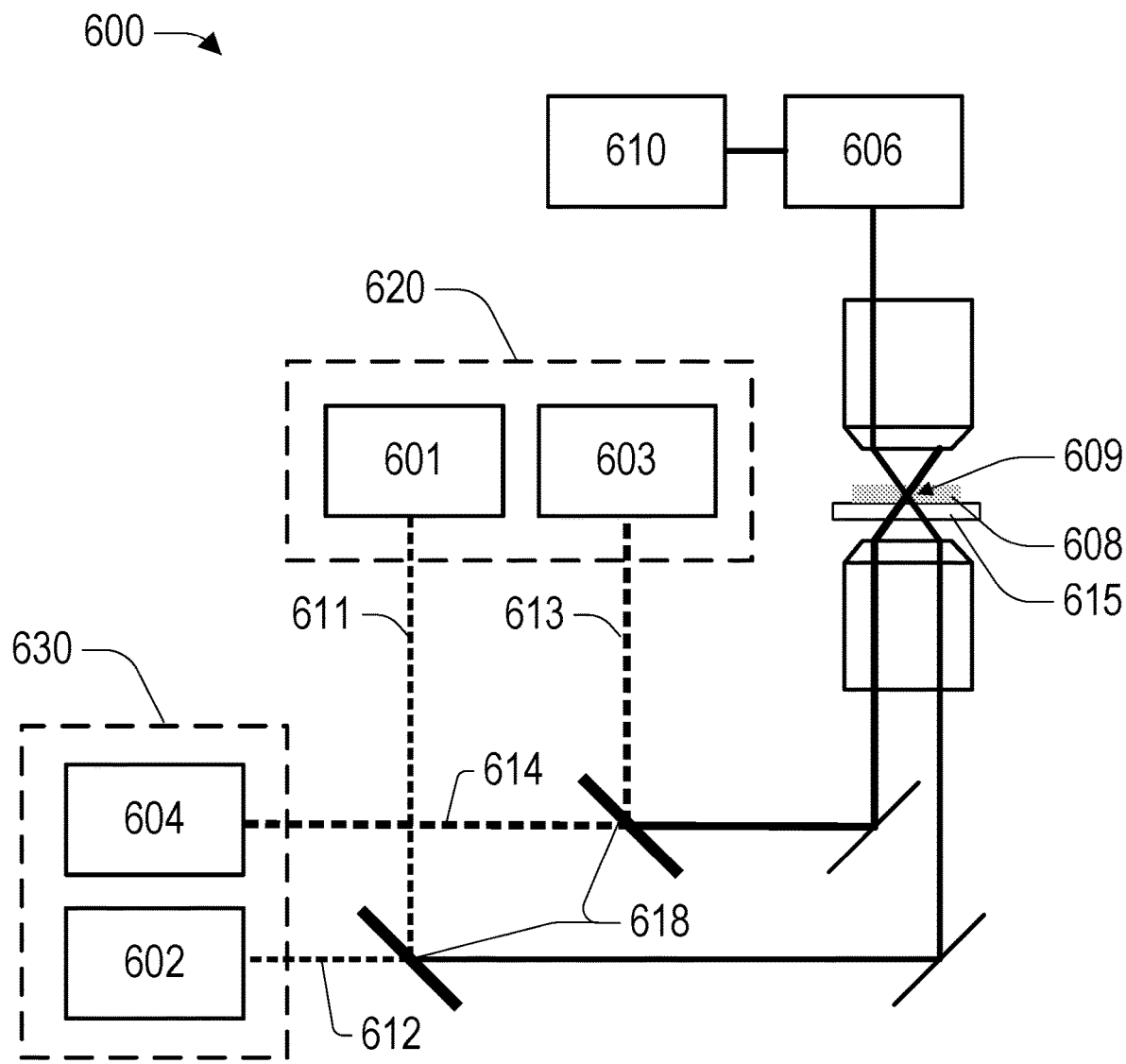
FIG. 6 is a schematic of a Brillouin microscopy system for measuring the longitudinal and shear moduli information of a medium, in accordance with one aspect of the present disclosure.

FIG. 6 is a schematic of a Brillouin microscopy system 600 for measuring the longitudinal and shear moduli information of a medium 608, such as may be used with the methods described herein. The system 600 includes a longitudinal configuration 620 having a first probe optical source 601 configured to apply a first probe beam 611 to a target section 609 of the medium and a first pump optical source 603 configured to apply a pulsed first pump beam 613 to the target section 609 of the medium. The system can also comprise a shear-wave configuration 630 having a second probe optical source 602 configured to apply a second probe beam 612 to the target section 609 of the medium and a second pump optical source 604 configured to apply a second pump beam 614 to a target section 609 of the medium, wherein the first pump beam 613 interacts with the first probe beam 611 or the second pump beam 614 interacts with the second probe beam 612 to generate at least one acoustic wave in the medium and at least one Brillouin signal is produced as a result of the generated acoustic wave. The system further includes a sensor 606 configured to receive the produced Brillouin signal and a processor 610 configured to determine information associated with at least one of a longitudinal modulus or a shear modulus of the target section 609.

The first probe beam 611 and first pump beam 613 may not be applied to a target section 609 of the medium at the same time that the second probe beam 612 and second pump beam 614 are applied to the target section 609 of the medium. As shown, the system 600 may comprise an adjustment system 618 configured to switch between applying the first probe and pump beams (611, 613) and applying the second probe and pump beams (612, 614) to the target section 609. As shown, the adjustment system may include flip mirrors. Also as shown, the system 600 may further comprise a positioning system 615 configured to move the target section 609 of the medium with respect to the longitudinal and shear-wave configurations (620, 630).

EXAMPLES

The following examples are provided in order to demonstrate and further illustrate certain embodiments and aspects of the present disclosure and are not to be construed as limiting the scope of the disclosure.

Example 1

Longitudinal Stimulated Brillouin Scattering

The following experimental and prophetic remarks relate to the development and characterization of a system and method for longitudinal stimulated Brillouin scattering.

Without being bound by theory, longitudinal-wave Brillouin spectroscopy determines $f_L$ which is proportional to $v_L$. The acoustic speed is related to the compliance coefficient along the acoustic propagation direction: if the direction is in the x-axis, $c_{11}=\rho v_L^2$ (if z-axis, $c_{33}=\rho v_L^2$). For isotropic materials, $c_{11}=\lambda+2\mu$ $(=c_{33})$, and $c_{11}$ is equal to longitudinal modulus $M=\rho_0 v_L^2$. M is related to bulk modulus K and shear moduli G: M=K+4/3G. $\rho_0 v_s^2$=G for shear waves. In soft tissues, G  K, so M≈K. K=1/β where β=−(1/V)(∂V/∂$_p$) is volume compressibility, where V is volume and p hydrostatic pressure; therefore, $f_L \approx 2$ $(2n/\lambda_o)\sqrt{1/(\rho\beta)}$(Eq. 1). Water-containing soft materials, such as hydrogels and tissues, can be modeled as a two-part mixture of liquid water plus a "solid" part. The latter is mostly hydrated proteins including collagen fibers. If the contribution of solid-liquid interactions is neglected, the liquid and solid parts additively contribute to the physical properties of the tissue. Let $V_w$ denote the volume of water in tissue, and $V_s$ the volume of the other constituents. Since the total volume is the sum of the two parts, $V=V_w+V_s$, the volume fraction of water is expressed as $f_w=V_w/(V_w+V_s)$, and the volume fraction of the solid part is $1-f_w$. In terms of the volume fraction of water, the refractive index, density, and compressibility can be described as: $n=n_w f_w+n_s(1-f_w)$, $\rho=\rho_w f_w+\rho_s(1-f_w)$; and $\beta=\beta_w f_w+\beta_s(1-f_w)$, where $n_w$, $\rho_w$ and $\beta_w$ are the refractive index, density, and compressibility of water, and $n_s,\rho_s$ and $\beta_s$ are these properties of the solid components.

From Eq. (1), $=\Delta f_L/f_L=\Delta n/n-0.50\Delta\rho/\rho-0.5\Delta\beta/\beta$. This can be expressed in terms of the change of hydration H, which is defined as H=(total tissue weight–dry weight)/dry weight, and the compressibility of the solid part, $\beta_s$: $\Delta f_L/f_L \approx -0.08\Delta H/H-0.1\Delta\beta_s/\beta$, when $f_w \approx 0.75-0.8$ and H≈3.2. The equation indicates that the longitudinal Brillouin frequency provides information about hydration and the compressibility $\beta_s$ of the protein constituents. For corneal stroma, collagen fibrillary structure is the dominant contributor to $\beta_s$.

For cells, longitudinal Brillouin frequency is sensitive to changes in solid-liquid volume ratio and the compressibility of the cytoplasmic macromolecules and cytoskeleton. While cell volume can vary as much as 100%, the density variability of cells is small, <1%. A small difference in cell density can affect cell biology and is universally related to shear modulus. The interaction between the liquid and solid components within the cytoplasm regulates the rheological behavior of cells and can play a prominent role in how cells deform and move. In turn, the hydro-mechanical properties of cells can influence intracellular water transport, cytoskeletal network modulation and cell volume regulation.

The Brillouin scattering cross section in isotropic liquids is given by $$\sigma = \frac{\pi^2 V}{2\lambda_o^4}\left(\frac{\gamma^2}{K}\right)k_B T(1+\cos^2\theta),$$

where K is bulk modulus, $k_B$ the Boltzmann constant, T temperature, V volume of the interaction region, θ the scattering angle, and $\gamma=\rho\partial\epsilon/\partial\rho$ the electrostriction constant where ε is dielectric constant and ρ is density. For isotropic materials, γ is related to the photo-elastic coefficient $p_{12}$ for longitudinal acoustic waves and $p_{44}$ for shear acoustic waves. For longitudinal waves, $\gamma^2\approx 1$. The theoretical maximum collection efficiency of Brillouin scattering in the on-axis confocal configuration is given by $$S_c = \frac{2\pi^2}{\lambda_o^3}\left(\frac{\gamma^2}{K}\right)k_B T.$$

In a lossless system, $S_c \approx 5.4\times 10^{-11}$. The theoretical shot-noise-limited SNR is: SNR (spontaneous, longitudinal)=0.5 $\rho\alpha_s S_c P_0 \approx 2.7\times 10^{-11}$ $\eta\alpha_s P_0$ (Eq. 2) where η is the photon-to-electron conversion efficiency of a photodetector or CCD camera, $\alpha_s$ is optical loss in the system, and $P_0$ is the input optical power. Experimentally, we measured $\alpha_s \approx 0.006$, which includes a ~10-dB optical loss in a spectrometer and 4 dB loss in fiber coupling. We found that current spontaneous Brillouin microscopy has reached the theoretical SNR limit within a factor of <10.

We have considered the SBS process between a pump and a probe beam. The SBS gain coefficient is $g_0=\gamma^2\omega^2/(nv_L sc^3\rho_0\Gamma_B)$ (Eq. 3), where $\gamma_B$ is the Brillouin linewidth, typically $\Gamma_B/2\pi=\sim 400$ MHz. We find $g_0=3.5\times 10^{-5}$ $(0.78/\lambda_0)^3$ μm/W. This theoretical value agrees well with the experimentally measured gain value of water, $g_0=3.4\times 10^{-5}$ μm/W at $\lambda_0=780$ nm. The SBS gain is given by $g=g_0 I_1\Delta z$, where $I_1$ is the pump beam intensity and Δz is the acousto-optic interaction length. The probe beam intensity is described by: $I_2(\text{output})=I_2(\text{input})*(1+g)$. For focused beams with a Gaussian profile, we can define an effective beam waist area, $A=\Delta x^2$, where $\Delta x=0.4\lambda_o$NA and NA is numerical aperture in a medium with refractive index n. The effective confocal interaction length is $\Delta z\approx 0.8 z_R$, where $z_R=n\lambda_o/(NA)^2$. Using $I_1=P_1/A$ we obtain $g=3.1\times 10^{-4}$ $P_1$ [W$^{-1}$] at $\lambda_o=0.78$ μm (Eq. 4). In a lossless system, the optical signal at a photodetector is then $P_2(\text{out})=P_2(\text{in})$ $\{1+g \cos(2\pi f_1 t)\}$, where $f_1$ is the modulation frequency of the probe (~1 MHz, see below). The shot-noise-limited SNR is SNR (longitudinal SBS)=0.5 $g^2\eta P_2$ (Eq. 5).

With Eq. (2) and Eq. (5), we can compare the SNR of the spontaneous and stimulated processes, using $P_0=\langle P_1 \rangle+\langle P_2 \rangle$, where the bracket indicates time average. For a given total power, it can be shown that shot-noise-limited SNR in SBS is maximized when $I_1=2I_2$ and, thus, $P_0=3\langle P_2 \rangle$. The condition for SBS to have higher gain than spontaneous scattering is: $g^2 P_2 > 6\times 10^{-11}$ $P_0$ and thus$g>1.3\times 10^{-5}$, from Eq. (4), the pump power required to produce this much gain is $P_1>42$ mW, and the total power, $\langle P_1 \rangle+\langle P_2 \rangle$, should be greater than 64 mW. $P_0$ is usually limited to maximum 10 mW (at 780 nm) to avoid thermal damage to samples. Then, max $\langle P_1 \rangle=6.7$ mW and max $\langle P_2 \rangle=3.3$ mW. Therefore, when CW light is used for SBS, spontaneous Brillouin microscopy has higher SNR unless the total pump power exceeds the maximum permissible exposure (MPE) level of ~32 mW at $\lambda_o=0.78$ μm for skin and corneal tissues (and cells). Consequently, stimulated Brillouin scattering microscopy using continuous wave light is of limited value.

In our attempt to overcome the limitations of spontaneous Brillouin microscopy, we discovered that stimulated Brillouin scattering microscopy with a pulsed pump and probe light could yield improved results while still operating within the maximum permissible exposure levels of skin and corneal tissues. As further explained below, using optical pulses with a judicious choice of pulse widths and duty cycles, the optical powers $P_1$ and $P_2$ can each be two orders of magnitude greater than their time-average values $\langle P_1 \rangle$ and $\langle P_2 \rangle$; therefore, the SNR can be greatly enhanced compared to CW SBS.

Figure 7:
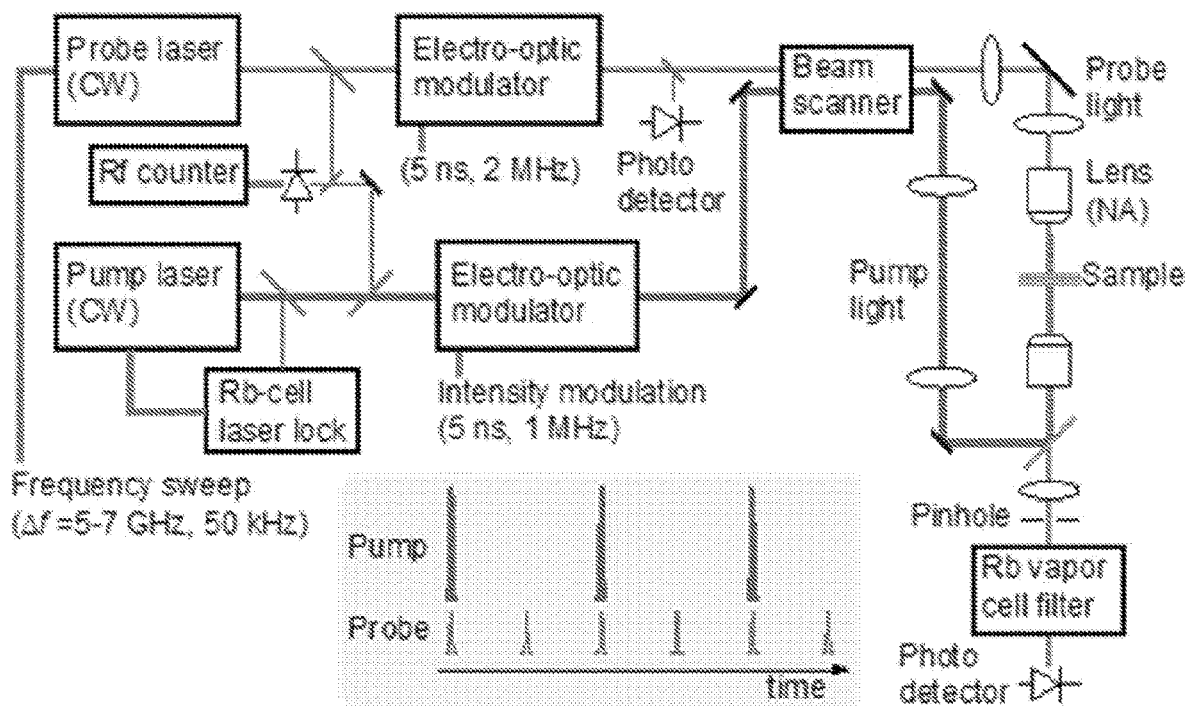
FIG. 7 is a schematic of a prophetic experimental system for measuring the longitudinal modulus of a medium using stimulated Brillouin scattering.

FIG. 7 depicts a prophetic experimental system for measuring the longitudinal modulus of a medium using stimulated Brillouin scattering. The ideal pulse width for SBS was found to be about 2-5 ns (i.e. frequency bandwidth of 100-250 MHz). Pulses shorter than 1 ns reduced SBS efficiency because the spectral bandwidth is broader than the Brillouin linewidth, $\Gamma_B/2\pi$. Pulses longer than 5 ns decreased SNR because the peak power is reduced for a given average power. We could not find laser sources that emit transform-limited nanosecond pulses with continuous tuning capability. As a solution, we can produce nanosecond pump and probe pulses by intensity-modulating the outputs of single-frequency, continuously-tunable, CW lasers (e.g. TA Pro, Toptica) with high output power of up to 4 W at 780 nm. The electro-optic modulation can be synchronized so that probe pulses enter the sample at twice the rate of pump pulses. At the sample, the SBS process increases (or decreases depending on their relative frequency) the intensity of the probe light when pump light was present. This SBS-induced gain of the probe light energy can be measured using a photo-diode. The intensity of the probe pulses before the sample can be measured by a separate photodiode and subtracted from the output photodetector signal with proper scale factors for dual balanced detection to reduce RIN noise. A SBS spectrum can be obtained as the frequency of the probe laser is tuned over a range of ~600 MHz at a rate of 50 kHz, from which the Brillouin frequency can be determined as the location of peak SBS-induced gain.

Laser frequency control. Accurate measurement of the frequency difference of the pump and probe is required for reliable, long-term experiments. Although direct locking of two CW laser sources is possible, we can initially lock both lasers to a $^{85}$Rb vapor transition line using a lock option (e.g. DLS-Pro, Toptica), and while the pump laser remains locked, the probe laser can be tuned, using a PZT built in the laser source, away from the pump frequency (lowered by ~5.7 GHz). The beat frequency between the pump and probe can be measured using a high-speed photodiode. Tuning of the probe laser can be performed in a feedback subsystem where the electrical signal from the high-speed photodiode is mixed with a tunable local oscillator signal. The frequency of the mixed signal can represent the error signal and can be compensated by a proportional-integral-derivative controller through PZT control to match the beat frequency between the pump and probe beams to the configured local oscillator frequency. Alternatively, the beat frequency between the pump and probe beams can be measured using a high-speed photodiode and a microwave counter and used to control the tuning of the probe laser.

Filtering out the pump. We can use a high-pressure Rb vapor filter (60° C.) in front of the final photo-detector to remove back-reflected pump light and transmit the SBS-modulated probe light. The frequency lock of the pump laser can be automatically aligned the laser frequency to the filter. The effectiveness of Rb cells in Brillouin spectroscopy has been previously demonstrated. Without being bound by theory, a high extinction over >100 dB can in principle be obtained.

SNR in pulsed operation. The signal current of the detector can be expressed as $\langle i_s(t) \rangle = e\eta \langle \alpha P_2 \rangle g \cos(2\pi f_1 t)$, where $\alpha$ is the optical loss in the path from the sample to the detector. Typical silicon detectors have a responsivity of 0.55 A/W and $\eta \approx 3.4 \times 10^{18}$ at 780 nm and a thermal noise current of $i_{th} \approx 2.2$ pW/$\sqrt{\text{Hz}}$. The total noise power is a sum of thermal, shot, and intensity noises: $\langle i_n^2(t) \rangle = (i_{th}^2 + 2e^2\eta \langle \alpha P_2 \rangle + e^2 \text{RIN} \eta^2 \langle \alpha P_2 \rangle^2$, where RIN is relative intensity noise (RIN) of the probe laser. For $\langle \alpha P_2 \rangle >> 1$ nW, the thermal noise is negligible compared to the other two terms. Because the probe light is pulsed, the peak power can be greater than the average power by a ratio m $P_2/\langle P_2 \rangle$, and RIN was increased by a factor m compared to CW operation at the same average power. For an integration bandwidth of BW [Hz], SNR=$0.5 \, g^2 \eta \langle \alpha P_2 \rangle /(2 \, BW + m\text{RIN} \eta \langle \alpha P_2 \rangle BW)$. Since SBS gain g is proportional to m, $g^2 \propto m^2$ and SNR $\propto \sim$m.

Balanced detection. Although this analysis already shows the SNR benefit of pulsed operation, SNR could be increased further by reducing RIN. Unlike thermal and shot noise, which are of quantum origin, RIN noise is classical noise and can be measured by tapping a small portion of the probe pulses as depicted in FIG. 7. This measured noise is subtracted with an appropriate scale factor from the SBS signal that contains the same intensity noise. This technique is called balanced detection. With 20-dB RIN suppression, which is possible, and m=100, we get $$SNR_{balanced\ detection} = \frac{0.5 \, g^2 \eta \langle \alpha P_2 \rangle}{(2 + RIN\eta \langle \alpha P_2 \rangle)BW}. \quad \text{(Eq. 6)}$$

The experimental laser sources can have relatively low RIN below ~145 dB/Hz at frequencies above 100 kHz. The condition that the shot noise is equal to the RIN noise is: $\eta \langle \alpha P_2 \rangle = 2/\text{RIN}$. For $\alpha=0.25$ (6 dB loss), we get $\langle P_2 \rangle=0.74$ mW. It can be shown that the optimal power is $\langle P_2 \rangle / P_0 = (\sqrt{9+4a}-3)/2a$, where a RIN $\eta \alpha P_0$. For $\alpha=0.25$ and $P_0=5$ mW, we get $\alpha=13.4$ and $\langle P_2 \rangle/P_0=0.18$. For a in a wide range of 1 to 100, the optimum $\langle P_2 \rangle/P_0$ ranges between 0.1 and 0.3. So, as a general guideline, we choose $\langle P_2 \rangle = 0.2 P_0$, i.e., $\langle P_1 \rangle : \langle P_2 \rangle = 4:1$.

Figure 8:
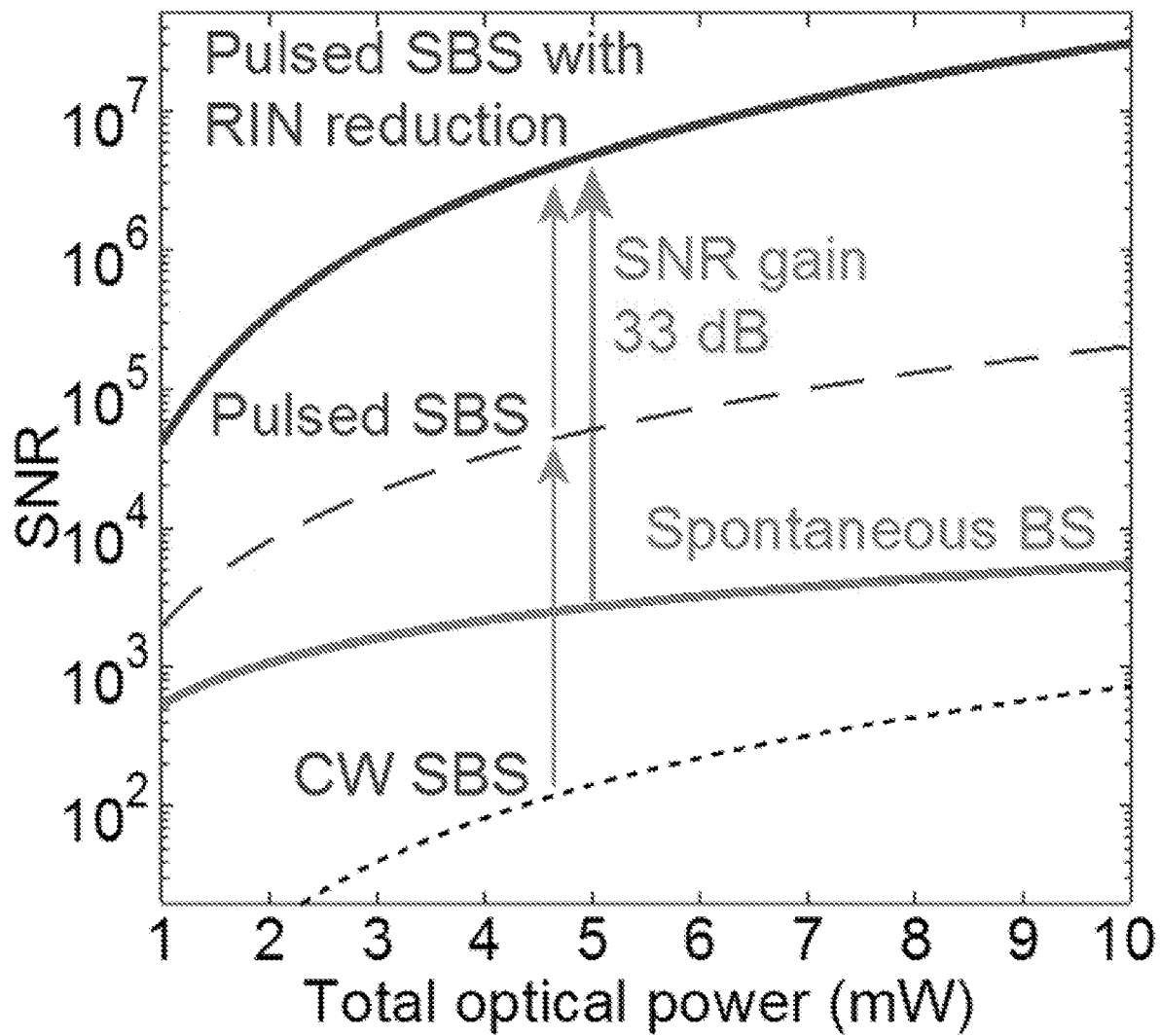
FIG. 8 is a chart depicting the expected SNR of a prophetic experimental system at an integration time of 1 second for various regimes as a function of total average power $P_0$.

Expected SNR. As initial parameters, we can use $\langle P_1 \rangle = 4$ mW, $\langle P_2 \rangle = 1$ mW and repetition rates of 1 MHz for the pump and 2 MHz for the probe, as shown in FIG. 7. Too high a repetition rate decreases the pump peak power for the given time-average power levels, and too low repetition limits the data acquisition speed and allows higher RIN below 100 kHz. We choose a Gaussian pulse width of 5 ns for both the pump and probe light. For a given pulse energy, shorter pulses have higher peak power and produce higher Brillouin gain but worsen the frequency resolution. 5 ns was found to be optimal for attaining an adequate frequency resolution of ~100 Hz with large gain. With these parameters, we find that the average pulse energy is 4 nJ and peak power $P_1$ is 0.8 W. From Eq. (4), $g=2.5 \times 10^{-4}$. Our state-of-the-art spontaneous Brillouin system is operated at an integration time of 0.2 s and $P_0=5$ mW and has $S_{collected} \approx 3 \times 10^{-13}$ and $\alpha_s \approx 0.006$, largely due to the spectrometer loss, fiber coupling, and camera noise. Using $\alpha=0.25$ in Eq. (6), we can expect a SNR gain of ~2,000 for SBS (FIG. 8).

This case is summarized in Table 1. To determine the peak Brillouin frequency shift, the probe laser frequency can be tuned with a sinusoidal waveform over a range of about 5.6 to 6.2 GHz (or as necessary) relative to the pump laser frequency. The photodetector signal can be digitized at a sampling rate of 10 MS/s. A Brillouin spectrum can be constructed from the data collected as a function of the pump-probe frequency difference. Prior spontaneous Brillouin systems have been limited to operating at an integration time of about 0.2 s. At the same SNR, the experimental SBS system and method can be operated with a pixel integration rate of 10 kHz, roughly 2,000 times faster than spontaneous Brillouin microscopy. Multiple spectra could be averaged to improve the frequency sensitivity at the expense of the pixel rate. The Brillouin frequency measurement error can be <10 MHz.

TABLE 1

Experimental operation parameters and the expected SNR gain and data acquisition speed compared to a spontaneous Brillouin microscopy system.

| Mode | Pump power | Probe power | Pump pulse width | Pump rate | Pump peak power | SNR ($Hz^{-1}$) | Integration time |
|---|---|---|---|---|---|---|---|
| Spontaneous | 5 mW | — | CW | — | 5 mW | 2,500 (exp.) | 0.2 s |
| Stimulated | 4 mW | 1 mW | 5 ns (1) | 1 MHz | 0.8 W | $5 \times 10^6$ | 100 µs |

Example 2

Shear-wave Stimulated Brillouin Scattering

The following experimental and prophetic remarks relate to the development and characterization of a system and method for shear-wave stimulated Brillouin scattering.

Without being bound by theory, in soft-matter physics and engineering, as well as tissue and cell biomechanics, arguably the most important mechanical property is shear modulus G or µ. Most biomaterials are viscoelastic, so both the real (elastic) and complex (viscous) components, G' and G", are of interest. G" is responsible for stress relaxation of ECM, which affects cell spreading and differentiation. Shear modulus is of purely entropic origin related to the configurational free energy of polymeric chains, whereas bulk modulus is due largely to the elastic energy stored in both intramolecular and intermolecular chemical bonds. So, shear and longitudinal moduli provide different, complementary information.

The shear Brillouin frequencies of most biological samples range between ~1 to 100 MHz, which we estimate from published values of G measured mechanically and acoustically. Unfortunately, optical filters capable of reliably discriminating MHz frequency differences are not readily available. Spontaneous shear Brillouin measurement has been applied to solid samples with GHz-scale frequency shifts but has never been demonstrated for biological samples. SBS could overcome this difficulty because the Brillouin scattered light is phase-coherent with the probe and pump beams, especially when they come from a single-frequency laser. The shear SBS signal can be detected with heterodyne detection using a standard photodiode.

For shear SBS in hard solid materials, shear electrostriction $\gamma^2$ is 100 times smaller, acoustic speed $V_S$ is 500 times smaller, and linewidth $\Gamma_B$ is 100 times smaller than for longitudinal SBS. Thus, from Eq. (3), we find that the shear-wave SBS gain coefficient would be ~500 times greater than longitudinal-wave SBS. For soft materials, this estimation should be corrected for three factors. First, the gain is reduced by the presence of water because liquid water does not support shear waves and it produces zero SBS gain. So, the SNR gain should be multiplied by the solid volume fraction, which is 0.2-0.3. Second, the pump and probe beams must be crossed)(~90°, so the interaction length becomes ~2Δx, slightly reduced from Δz by a factor of NA/n. Lastly, because of small $\Gamma_B$ pulsed operation does not make sense and the optimal CW pump and probe powers are close to $P_1$=4 mW and $P_2$=1 mW. Taking all these factors into account, the expected shear-wave SBS gain is about the same as that of CW longitudinal-wave SBS. Considering the lower optical loss in the SBS setup compared to VIPA Brillouin spectroscopy, we estimated that the acquisition speed of shear SBS microscopy would be equal to or 10-times faster than spontaneous longitudinal systems.

Recently, we developed a spontaneous shear Brillouin microscope using an off-axis confocal beam geometry and a two-stage VIPA spectrometer. The polarization state of shear-induced Brillouin light is orthogonal to the input polarization state, unlike longitudinal Brillouin scattering where the original polarization state is maintained. Therefore, polarization-based filtering discriminates shear from longitudinal Brillouin signals. The Brillouin spectra of polycarbonate, fused quartz, and borosilicate glass were recorded with an acquisition time of 1-10 s at an input power of 10 mW with a spatial resolution of ~1 µm. The spectrometer-based system is able to resolve is >1 GHz, so it cannot be applied to soft materials with MHz-range Brillouin frequencies.

Figure 9:
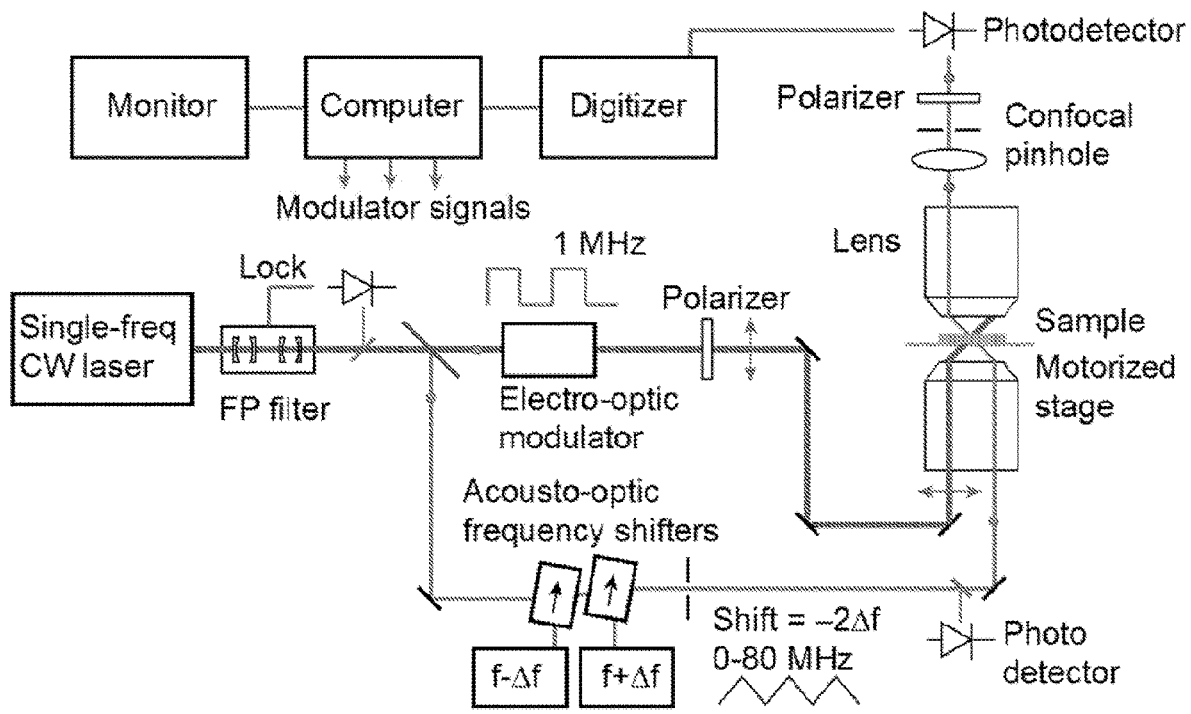
FIG. 9 is a schematic of a prophetic experimental system for measuring the shear modulus of a medium using stimulated Brillouin scattering.

Design of a shear-wave SBS microscope: For shear SBS, we have devised an alternative scheme based on interference detection. The schematic is shown in FIG. 9. We can use a single-frequency, extended-cavity tunable laser (DL Pro, Toptica), which is locked to an $^{85}$Rb vapor cell. We can employ a tandem Fabry-Perot filter to reduce the spontaneous emission noise. The transmission peak of the filter can be piezo-controlled so that it could be locked to the laser frequency. The purified laser spectrum was split into pump and probe beam paths. The intensity of the pump light was modulated with a square waveform at 1 MHz using an electro-optic birefringence modulator and a polarizer. The probe light can be sent through a pair of acousto-optic frequency shifters (FS) (e.g. 1250C, ISOMET, f=200 MHz, rf bandwidth Δf=±50 MHz). The tandem FS can be arranged such that the carrier frequency shifts are cancelled out, generating a net frequency shift by the difference of the two driving frequencies. By varying the driving frequencies, the optical frequency difference between the pump and probe can be scanned from 0 to 80 MHz. As the FS was swept, the diffraction efficiency is supposed to vary due to varying diffraction efficiency. A separate detector can be placed to measure the probe intensity to compensate for the variation in post processing. The pump and probe beams can have orthogonal polarization states. After the sample, the SBS-modulated, transmitted probe light can be detected by a photodetector through a pinhole for confocal gating and a polarizer to block stray pump light. For balanced detection, the probe intensity is measured before the sample was subtracted from the photodetector signal with a proper scale factor, reducing common RIN noise. Alternatively, a local oscillator beam may be tapped from the pump beam and combined with the signal beam by a 50/50 beam splitter, and the interference signals at the two ports of the beam splitter can be measured with a dual-balanced detector. The measured signal can be demodulated at the pump modulation rate (1 MHz) to measure the amplitude of the probe intensity modulation as a function of the pump-probe frequency difference. From the SBS spectrum, the Brillouin frequency can be determined. Since the pixel scan rate is expected to be an order of 10 Hz, a motorized XYZ translation sample stage can be used.

If the diffraction efficiency variation over the frequency tuning range of ±40 MHz causes too large power variation, we would employ a double-pass, cat's eye configuration for each FS device to reduce the intensity variation and eliminate any beam diffraction-induced deflection of the probe light after the devices.

The measurable modulus range would be about 1 Pa ($f_S$=80 kHz) to 1 MPa ($f_S$=80 MHz), which covers most soft biomaterials. The lower limit comes from the RIN noise increasing sharply below 1 kHz. The upper limit is due to the finite tuning range of frequency shifters. For much harder materials, shear SBS can in principle be obtained with a setup modified from the longitudinal-wave SBS microscope such that the pump and probe beams are now cross-polarized and cross-propagating; the pulsed operation provides a SNR gain compared to CW shear SBS.

The system parameters and expected performance are summarized in Table 2.

S and C are each a 6×6 symmetric matrix with 21 independent components. In most materials with certain symmetry, the number of independent components is considerably reduced. Materials with fibrillary structures—for example, corneal stroma with organized collagen fibrils—have transverse-isotropic mirror-symmetry. This type of material belongs to the space group $D_{\infty h}$ and has an elastic tensor in hexagonal symmetry with four independent parameters, $C_{11}$, $C_{13}$, $C_{44}$, and $C_{66}$ ($\because C_{12}=C_{11}C_{66}$). The longitudinal acoustic wave speed, $v_L$, and shear wave speed, $v_S$, are directly related to these parameters. The acoustic speeds propagating along the cylindrical axis are $v_{L,3}^2=C_{33}/\rho$ and $v_{S,3}^2=C_{66}/\rho$, where subscripts L and S represent longitudinal and shear waves, respectively, and p is the density of the material. For waves propagating in the transverse plane, $v_{L,1,2}^2=C_{11}/\rho$ and $v_{S,1,2}^2=C_{44}/\rho$. The simplest case is that of a material that is isotropic in all directions, such as polymers and hydrogels consisting of randomly-orientated polymeric chains. The elastic tensor of such an isotropic material is described by two Lamé parameters, $\lambda$ and $\mu$: $C_{44}=\mu$, $C_{12}=C_{13}=\lambda$, $C_{11}=C_{33}=\lambda+\mu$, and thus $$v_L^2 = \frac{\lambda + 2\mu}{\rho} \text{ and } v_S^2 = \frac{\mu}{\rho}.$$

Recall that Brillouin frequencies are given by: $f_L=nv_L/\lambda_o$ and $f_S=nv_S/\lambda_0$. For most materials, n and ρ are known (~1.41 and ~1,050 kg/m³ respectively). Therefore, by measuring $f_L$ and $f_S$ (in three directions), the full compliance matrix can in

| Mode | Pump power | Probe power | Pump & probe | SNR (Hz⁻¹) | Pixel rate | Frequency resolution | Frequency range |
|---|---|---|---|---|---|---|---|
| Shear SBS | 4 mW | 1 mW | CW | 2.5 × 10⁴ | ~10 Hz | 100 kHz | 0.1-80 MHz |

Example 3

Combined Longitudinal-Shear Stimulated Brillouin Microscopy

The following experimental and prophetic remarks relate to the development and characterization of a system and method for combined longitudinal-shear stimulated Brillouin microscopy.

The measurement of both longitudinal and shear Brillouin frequency shifts simultaneously will enable us to determine the compliance matrix of a microscopic volume within a sample. Following the inventions described above, we can combine the two systems into a common sample stage. This allows the acquisition of both longitudinal and shear moduli information nearly simultaneously. The longitudinal and shear moduli provide complementary information about the polymeric content, degree of crosslinking, and water-to-solid ratio of samples. Therefore, we expect that the combined system can be used to characterize the mechanical properties of hydrogels, cells, and tissues more comprehensively than individual instruments that measure either of the two. Furthermore, the combined system will allow us to investigate the phenomenological correlation between longitudinal and shear moduli, which has been controversial.

Without being bound by theory, Hooke's law in 3D is defined as σ=Cε where σ is the stress tensor, ε is the strain tensor, and C is the compliance matrix of the material. The stiffness matrix S is defined by ε=Sσ; therefore, $S=C^{-1}$, and principle be determined. For isotropic materials, a single measurement along one axis is sufficient to determine all elastic moduli. For transverse-isotropic materials, $C_{11}$, $C_{13}$, $C_{44}$, and $C_{66}$ can be computed from the measurement of longitudinal and shear Brillouin frequencies at two different sample orientations.

Figure 10:
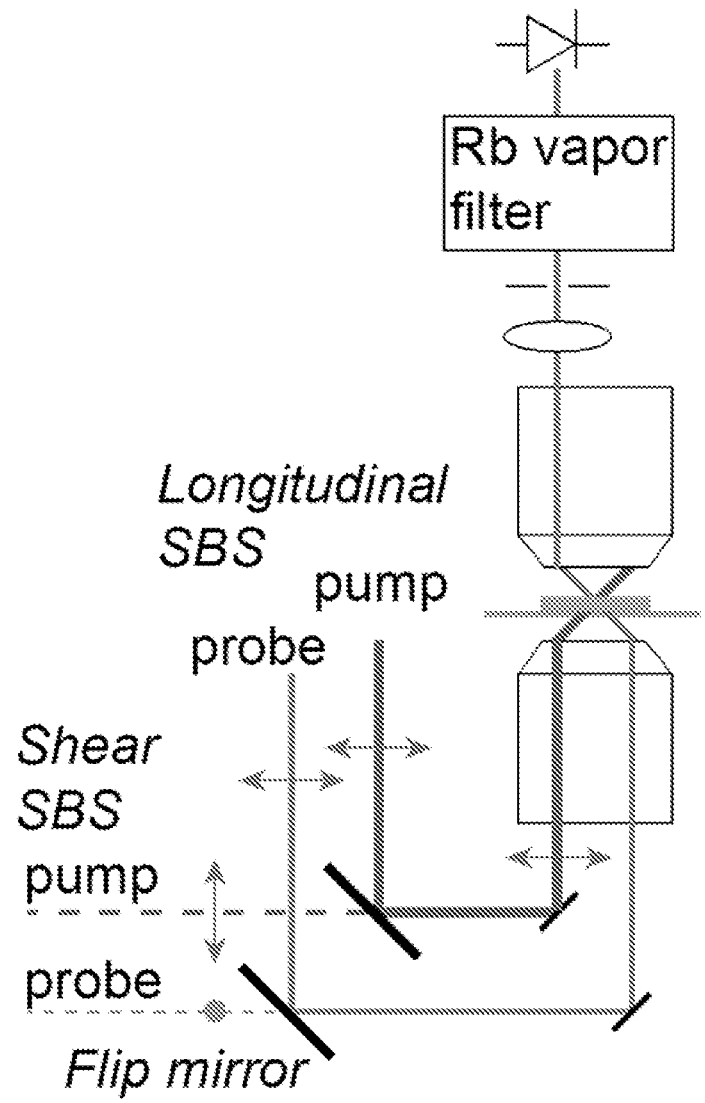
FIG. 10 is a schematic of a prophetic experimental system for measuring the longitudinal and shear moduli of a medium using stimulated Brillouin scattering.

To determine both longitudinal and shear moduli simultaneously, we modify the longitudinal SBS setup and combine it with the shear SBS microscope. The major modification required is to re-direct the pump and probe beams for longitudinal SBS so that they both enter the sample from the below, making a 90-deg angle to one another, as illustrated in FIG. 10.

The longitudinal SBS pulse modulation scheme is identical to that described earlier. A motorized sample stage is used as before. This allows the probe and sample beams in both longitudinal and shear SBS measurements to be fixed, ensuring stable foci overlap. The pump and probe beams for longitudinal SBS are aligned to the same paths as the pump and probe beams for shear SBS, such that the system can switch between the two modalities simply by using flip mirrors. This combined system provides an unprecedented opportunity to non-invasively measure the compliance matrix at each location within a sample with microscopic resolution.

Example 4

In order to validate the effectiveness of the longitudinal stimulated Brillouin scattering systems and methods described herein, an exemplary experiment was conducted.

The goal of this project is to build a high speed subcellular stimulated Brillouin microscope for mapping the elastic properties of cells and tissues. Imaging the elasticity of cells is important for understanding how cells respond to the stiffness of the extracellular matrices. Stiffness has been found to affect wound healing and metastasis, further investigation on this effect requires high resolution imaging instrument that could capture the dynamics of elasticity in cells. The existing Brillouin microscope had been used to study elastic properties of cells. However, the spontaneous scattering process by which it operates has small response signal thus requires a long integration time. In this project, we overlap two laser beams at the sample to stimulate Brillouin scattering. The two lasers are configured to have frequency separation that matches the acoustic vibration of the sample, thus enhances the generation of phonons and allows faster imaging speed. Stimulated Brillouin scattering (SBS) requires high laser power for the enhanced signal, to maintain a safe laser exposure for cells, we use pulse scheme to reduce the average power-. Depending on the configuration of the lasers, either the longitudinal or shear acoustic waves can be stimulated. We began by building the Brillouin microscope system for the longitudinal wave, optimizing the detection signal level. Subsequently, we aim to alter the microscope system to include shear wave measurement, followed by testing the microscope system with various materials.

EXPERIMENTAL RESULTS

Figure 11:
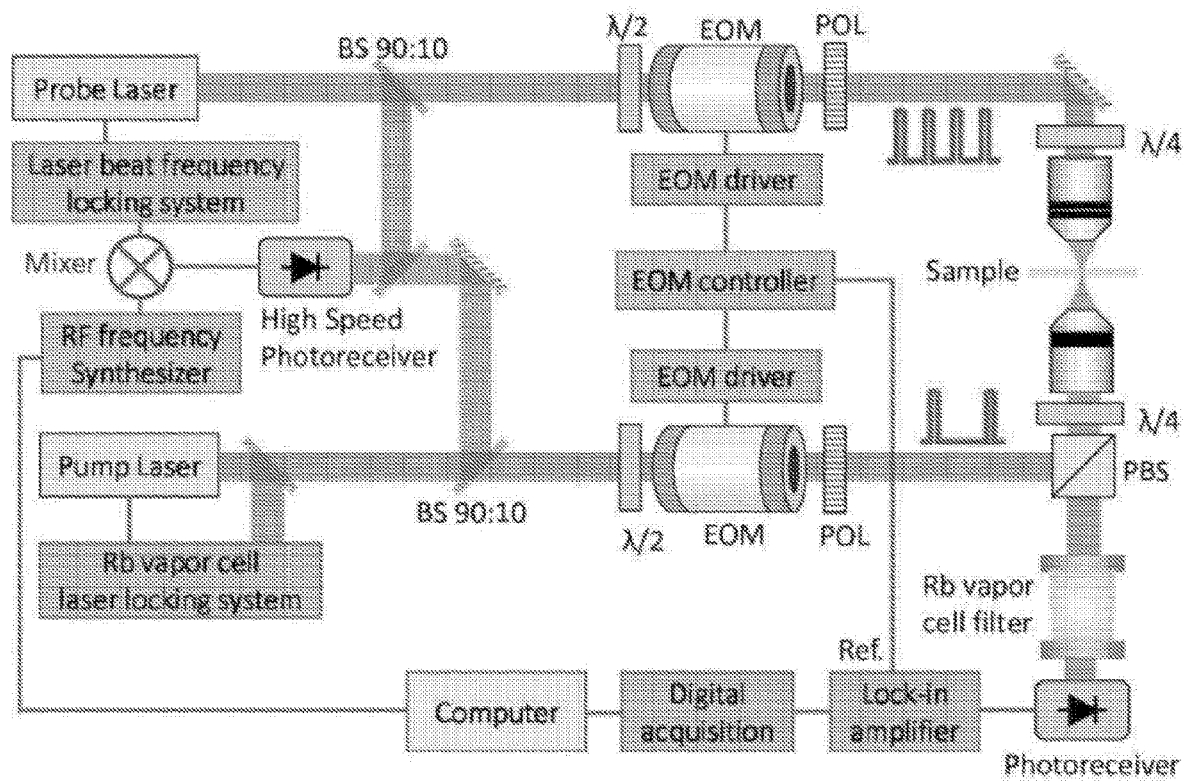
FIG. 11 is a schematic of a system for measuring the longitudinal modulus of a medium using stimulated Brillouin scattering, in accordance with the experiment of Example 4.

The primary components of a stimulated Brillouin microscope system for longitudinal waves have been constructed. The system includes two lasers, configured to counter-propagate and overlap each other in the sample to stimulate Brillouin scatterings. The schematics of the microscope system are shown in FIG. 11. The pump laser (Toptica TA Pro) is frequency-locked at Rubidium 85 D2 transition (780.24 nm) through the saturated absorption spectroscopy system. The frequency of probe laser (Toptica DL Pro) is offset by a small amount (~5 GHz) from the pump laser to match the Brillouin frequency shift of the sample. The beating frequency of the lasers is locked by a feedback system, in which a small fraction of the laser power is peeled off from each of the lasers, overlap through a 50/50 beam splitter and is detected by a high speed photoreceiver (Newfocus 818-BB-45). The electrical signal of the laser beating is mixed with a local oscillator that is set to the desired pump and probe frequency difference.

Each of the pump and probe laser beam passes through an electro-optic modulator (EOM), the laser beam experiences a π-phase shift through varying the Pockels cell's birefringence with high voltage fast switching. Then the laser beam passes through a polarizer, forming optical pulses that retain the peak power of the incoming continuous wave light. The EOMs are controlled by the respective EOM driver and an EOM controller that configures and synchronizes the pulse timing for both pump and probe lasers. In a preliminary test, the pulse periods were set to 2.5 μs and 2.0 μs for pump and probe lasers, respectively. For calibration purposes, the duty cycles for both laser pulses were set to 50% to enhance the signal level. Each laser beam passes through a quarter wave plate, focuses down to a spot of ≈1.0 μm diameter by a microscope objective and spatially overlaps with each other to stimulate Brillouin scattering in the sample. The probe laser carrying Brillouin signal experiences half wave shift when passing through the two quarter wave plates. Having half wave difference with the pump beam, the probe beam is directed toward the detection path by the polarizing beam splitter.

The detection path consists of a custom-made 150 mm Rubidium vapor cell filter heated up to 70° C. to suppress the pump reflection up to 50 dB. The probe laser with the Brillouin signal was detected by a photoreceiver (Newfocusmodel 2031). The detected signal was fed into a lock-in amplifier where the reference signal (pulses with repetition rate corresponds to the frequency difference between the two laser pulses) was generated by the EOM controller. The integration time of the lock-in amplifier was set to 10 ms, the maximum sensitivity level was set to 10 mV, the reference signal has a frequency of 100 kHz (The frequency difference between pump and probe pulses). The output signal of the lock-in amplifier was acquired by a digital acquisition board and processed by a computer. In the data acquisition process, the local oscillator frequency was stepping sequentially at 1 MHz interval over the frequency range of interest. The reading from lock-in amplifier was recorded for each frequency step, at 1 kHz rate.

Figure 12:
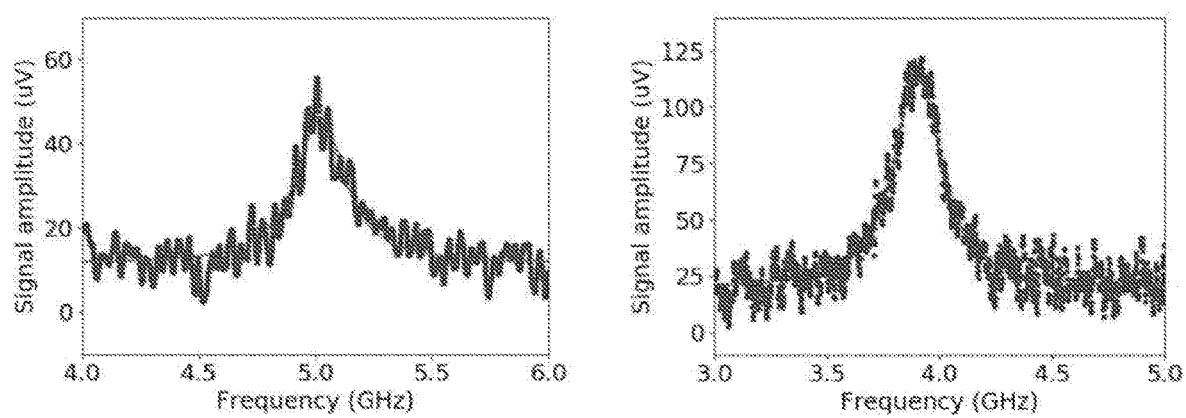
FIG. 12 depicts graphical results of the Brillouin gain spectrum of water (left) and ethanol (right) for the experiment of Example 4.

The peak pump and probe power measured at the sample was 0.8 W and 32 mW, respectively. The microscope objective has NA=0.6, the calculated laser focusing spot size is $2w \approx 1.0$ um and the Rayleigh length $2z \approx 1.4$ μm. The effective beam area is $A \approx 0.5$ μm$^2$. Given pump power of 0.8 W, the pump intensity is $I_p \approx 1500$ GW/m$^2$. Consider ethanol, which has Brillouin gain factor of g=0.12 (m/GW), Brillouin gain is calculated as $G=g\ I_p\ 2z \approx 2.5 \times 10^{-4}$. With the probe power measured at the detection ~0.5 mW, and the conversion gain of the photoreceiver given as $1.2 \times 10^3$, the expected signal strength is ~150 μV. In the case of water, the Brillouin gain factor is 0.048 (m/GW) and the expected signal strength is 60 μV. We tested the stimulated Brillouin microscope with water and ethanol contained inside a shallow well of 1 mm depth with a transparent glass base, the Brillouin gain spectra obtained experimentally are shown in FIG. 12. From the Brillouin gain spectra, the water and ethanol have Brillouin frequency shift of 5.0 GHz and 3.9 GHz, respectively, which are near the standard values, the difference is due to the small angle created between pump and probe beam to reduce the pump reflection. The linewidth of water and ethanol are 253 MHz and 244 MHz, respectively. The peak signal amplitude of water and ethanol are 46 μV and 118 μV, respectively, close to the expected signal strength of 60 μV and 150 μV. The signal to noise ratio of water and ethanol are 6.2 dB and 7.9 dB, respectively. Overall, the experimental results agree with the expected condition except the baseline noise is high which requires further investigation.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

We claim:

1. A method of analyzing at least one mechanical property of a medium using Brillouin microscopy, the method comprising:
    selecting parameters of a probe beam and a pulsed pump beam to achieve an integration time calculated to not exceed 100 µs;
    applying, using the parameters, the probe beam and the pulsed pump beam to a target section of the medium, wherein the pump beam interacts with the probe beam to generate at least one acoustic wave in the medium and at least one Brillouin signal is produced as a result of the generated acoustic wave;
    receiving the produced Brillouin signal; and
    determining, using a processor and the Brillouin signal, information associated with at least one mechanical property of the target section.

2. The method of claim 1, wherein the acoustic wave is amplified based on the interaction between the pump beam and the probe beam.

3. The method of claim 1, wherein the probe beam is pulsed.

4. The method of claim 3, wherein the probe beam pulses are applied at twice a rate that the pump beam pulses are applied to the target section.

5. The method of claim 1, wherein the total time averaged power of both the pulsed probe beam and the pump beam is controlled to not exceed 10 mW.

6. The method of claim 1, wherein the ratio of the time averaged power of the pulsed probe beam to the time averaged power of the pump beam is between 1:3 and 1:5.

7. The method of claim 1, wherein the pulse width of the pump beam is between 2 and 5 nanoseconds.

8. The method of claim 1, wherein determining the at least one mechanical property of the medium comprises compensating for the relative intensity noise of the probe beam.

9. The method of claim 1, wherein the at least one mechanical property includes a longitudinal modulus of the target section.

10. The system of claim 1, further comprising:
    a spatial pinhole to select Brillouin signal from a confocal point in the target section.

11. A Brillouin microscopy system for analyzing at least one mechanical property of a medium, the system comprising:
    a probe optical source configured to apply a probe beam to a target section of the medium;
    a pump optical source configured to apply a pulsed pump beam to the target section of the medium, wherein the pulsed pump beam interacts with the probe beam to generate at least one acoustic wave in the medium and at least one Brillouin signal is produced as a result of the generated acoustic wave;
    a sensor configured to receive the produced Brillouin signal and integrate the Brillouin signal within 100 µs; and
    a processor configured to determine information associated with at least one mechanical property of the target section using the Brillouin signal.

12. The system of claim 11, wherein the at least one mechanical property includes the longitudinal modulus of the target section.

13. The system of claim 11, wherein sensor is configured to measure a transmitted form of the probe beam after it has been transmitted through the target section, and wherein the Brillouin signal is contained within the transmitted probe beam.

14. The system of claim 11 further comprising:
    at least one quarter wave plate configured to alter the polarization of the probe beam; and
    a polarizing beam splitter configured to redirect the transmitted probe beam to the sensor.

15. The system of claim 11 further comprising:
    a filter configured to prevent back-reflected pump beam light from contacting the sensor.

16. The system of claim 11, wherein the probe optical source comprises a continuous wave laser and an electro-optic modulator.

17. The system of claim 11, wherein the probe optical source is configured to tune the frequency of the probe beam using a feedback signal provided from a second photo-diode sensor.

18. The method of claim 17, wherein the sensor integrates the Brillouin signal and wherein the integration of the electrical signal from the photo-diode sensor is performed using a boxcar integrator.

19. The system of claim 11, wherein the pump optical source and the probe optical source are configured to apply a pump beam and a probe beam that are approximately counter-propagating with one another.

* * * * *